(12) United States Patent
Klein et al.

(10) Patent No.: US 11,973,790 B2
(45) Date of Patent: Apr. 30, 2024

(54) CYBER DIGITAL TWIN SIMULATOR FOR AUTOMOTIVE SECURITY ASSESSMENT BASED ON ATTACK GRAPHS

(71) Applicant: Accenture Global Solutions Limited, Dublin (IE)

(72) Inventors: Dan Klein, Rosh Ha'ayin (IL); Elad Segev, Petah-Tikva (IL)

(73) Assignee: Accenture Global Solutions Limited, Dublin (IE)

(*) Notice: Subject to any disclaimer, the term of this patent is extended or adjusted under 35 U.S.C. 154(b) by 409 days.

(21) Appl. No.: 17/454,140

(22) Filed: Nov. 9, 2021

(65) Prior Publication Data

US 2022/0150270 A1 May 12, 2022

Related U.S. Application Data

(60) Provisional application No. 63/111,884, filed on Nov. 10, 2020.

(51) Int. Cl.
*G06F 21/00* (2013.01)
*G06F 11/34* (2006.01)
(Continued)

(52) U.S. Cl.
CPC ...... *H04L 63/1433* (2013.01); *G06F 11/3457* (2013.01); *H04L 63/145* (2013.01); *H04L 67/12* (2013.01)

(58) Field of Classification Search
None
See application file for complete search history.

(56) References Cited

U.S. PATENT DOCUMENTS

| 5,521,910 A | 5/1996 | Matthews |
| 6,279,113 B1 | 8/2001 | Vaidya |

(Continued)

FOREIGN PATENT DOCUMENTS

| EP | 1559008 | 8/2005 |
| EP | 1768043 | 3/2007 |

(Continued)

OTHER PUBLICATIONS

Hadar, Ethan et al. Cyber Digital Twin Simulator for Automatic Gathering and Prioritization of Security Controls' Requirements. 2020 IEEE 28th International Requirements Engineering Conference (RE). https://ieeexplore.ieee.org/stamp/stamp.jsp?tp=&arnumber=9218140 (Year: 2020).*

(Continued)

*Primary Examiner* — Jeremiah L Avery
(74) *Attorney, Agent, or Firm* — Fish & Richardson P.C.

(57) ABSTRACT

Implementations include determining a set of components within the connected vehicle ecosystem, components within the set of components representing at least one layer within the connected vehicle ecosystem, for each component in the set of components: providing a set of facts representative of the respective component, and providing a component digital twin using the set of facts, defining a set of digital twins including digital twins of components in the set of components, generating, using the set of digital twins, at least one AAG representative of potential lateral movement between components of the at least one layer within the connected vehicle ecosystem, the at least one AAG representing a contextual digital twin of components operating within the connected vehicle ecosystem, and evaluating the connected vehicle ecosystem using the at least one AAG.

20 Claims, 4 Drawing Sheets

(51) Int. Cl.
*H04L 9/40* (2022.01)
*H04L 67/12* (2022.01)

(56) References Cited

U.S. PATENT DOCUMENTS

| | | |
|---|---|---|
| 6,487,666 B1 | 11/2002 | Shanklin et al. |
| 7,540,025 B2 | 5/2009 | Tzadikario |
| 7,703,138 B2 | 4/2010 | Desai et al. |
| 7,904,962 B1 | 3/2011 | Jajodia et al. |
| 8,099,760 B2 | 1/2012 | Cohen et al. |
| 8,176,561 B1 | 5/2012 | Hurst et al. |
| 8,656,493 B2 | 2/2014 | Capalik |
| 8,881,288 B1 | 11/2014 | Levy et al. |
| 9,256,739 B1 | 2/2016 | Roundy et al. |
| 9,563,771 B2 | 2/2017 | Lang et al. |
| 9,633,306 B2 | 4/2017 | Liu et al. |
| 10,084,804 B2 | 9/2018 | Kapadia et al. |
| 10,235,523 B1* | 3/2019 | Keller, III ........... G06F 13/4282 |
| 10,291,645 B1 | 5/2019 | Frantzen et al. |
| 10,382,473 B1 | 8/2019 | Ashkenazy et al. |
| 10,447,721 B2 | 10/2019 | Lasser |
| 10,447,727 B1 | 10/2019 | Hecht |
| 10,601,854 B2 | 3/2020 | Lokamathe et al. |
| 10,630,716 B1* | 4/2020 | Ghosh ................. H04L 63/1408 |
| 10,642,840 B1 | 5/2020 | Attaluri et al. |
| 10,659,488 B1 | 5/2020 | Rajasooriya et al. |
| 10,771,492 B2 | 9/2020 | Hudis et al. |
| 10,848,515 B1 | 11/2020 | Pokhrel et al. |
| 10,868,825 B1 | 12/2020 | Dominessy et al. |
| 10,873,533 B1 | 12/2020 | Ismailsheriff et al. |
| 10,887,337 B1* | 1/2021 | Kim .................... H04L 63/1433 |
| 10,931,637 B2* | 2/2021 | Lam .................... H04L 63/0263 |
| 10,956,566 B2 | 3/2021 | Shu et al. |
| 10,958,667 B1 | 3/2021 | Maida et al. |
| 11,089,040 B2 | 8/2021 | Jang et al. |
| 11,128,654 B1 | 9/2021 | Joyce et al. |
| 11,159,555 B2 | 10/2021 | Hadar et al. |
| 11,170,334 B1* | 11/2021 | Orzechowski ......... G06N 20/00 |
| 11,184,385 B2 | 11/2021 | Hadar et al. |
| 11,228,612 B2* | 1/2022 | Vajipayajula ....... H04L 63/1466 |
| 11,232,235 B2 | 1/2022 | Hadar et al. |
| 11,277,431 B2 | 3/2022 | Hassanzadeh et al. |
| 11,281,806 B2 | 3/2022 | Hadar et al. |
| 11,283,824 B1 | 3/2022 | Berger et al. |
| 11,283,825 B2 | 3/2022 | Grabois et al. |
| 11,316,891 B2* | 4/2022 | Sbandi ................. H04L 63/1441 |
| 11,336,690 B1* | 5/2022 | Urias ................... H04L 63/1491 |
| 11,411,976 B2 | 8/2022 | Basovskiy et al. |
| 11,483,213 B2 | 10/2022 | Engelberg et al. |
| 11,533,332 B2 | 12/2022 | Engelberg et al. |
| 2005/0138413 A1 | 6/2005 | Lippmann et al. |
| 2005/0193430 A1 | 9/2005 | Cohen et al. |
| 2006/0037077 A1 | 2/2006 | Gadde et al. |
| 2008/0044018 A1 | 2/2008 | Scrimsher et al. |
| 2008/0289039 A1 | 11/2008 | Rits et al. |
| 2008/0301765 A1 | 12/2008 | Nicol et al. |
| 2009/0077666 A1 | 3/2009 | Chen et al. |
| 2009/0138590 A1 | 5/2009 | Lee et al. |
| 2009/0307772 A1 | 12/2009 | Markham et al. |
| 2009/0319248 A1 | 12/2009 | White et al. |
| 2010/0058456 A1 | 3/2010 | Jajodia et al. |
| 2010/0138925 A1 | 7/2010 | Barai et al. |
| 2010/0174670 A1 | 7/2010 | Malik et al. |
| 2011/0035803 A1 | 2/2011 | Lucangeli Obes et al. |
| 2011/0061104 A1 | 3/2011 | Sarraute Yamada et al. |
| 2011/0093916 A1 | 4/2011 | Lang et al. |
| 2011/0093956 A1 | 4/2011 | Laarakkers et al. |
| 2013/0097125 A1 | 4/2013 | Marvasti et al. |
| 2013/0219503 A1 | 8/2013 | Amnon et al. |
| 2014/0082738 A1 | 3/2014 | Bahl |
| 2014/0173740 A1 | 6/2014 | Albanese et al. |
| 2015/0047026 A1 | 2/2015 | Neil et al. |
| 2015/0106867 A1 | 4/2015 | Liang |
| 2015/0199207 A1 | 7/2015 | Lin et al. |
| 2015/0261958 A1 | 9/2015 | Hale et al. |
| 2015/0326601 A1 | 11/2015 | Grondin et al. |
| 2015/0350018 A1 | 12/2015 | Hui et al. |
| 2016/0105454 A1 | 4/2016 | Li et al. |
| 2016/0205122 A1 | 7/2016 | Bassett |
| 2016/0277423 A1 | 9/2016 | Apostolescu et al. |
| 2016/0292599 A1 | 10/2016 | Andrews et al. |
| 2016/0301704 A1 | 10/2016 | Hassanzadeh et al. |
| 2016/0301709 A1 | 10/2016 | Hassanzadeh et al. |
| 2017/0012836 A1 | 1/2017 | Tongaonkar et al. |
| 2017/0032130 A1 | 2/2017 | Joseph et al. |
| 2017/0041334 A1 | 2/2017 | Kahn et al. |
| 2017/0078322 A1 | 3/2017 | Seiver et al. |
| 2017/0085595 A1 | 3/2017 | Ng et al. |
| 2017/0163506 A1 | 6/2017 | Keller |
| 2017/0230410 A1 | 8/2017 | Hassanzadeh et al. |
| 2017/0289187 A1* | 10/2017 | Noel .................. G06F 16/9024 |
| 2017/0318050 A1 | 11/2017 | Hassanzadeh et al. |
| 2017/0324768 A1 | 11/2017 | Crabtree et al. |
| 2017/0364702 A1 | 12/2017 | Goldfarb et al. |
| 2017/0366416 A1 | 12/2017 | Beecham et al. |
| 2018/0013771 A1 | 1/2018 | Crabtree et al. |
| 2018/0103052 A1 | 4/2018 | Choudhury et al. |
| 2018/0152468 A1 | 5/2018 | Nor et al. |
| 2018/0159890 A1 | 6/2018 | Warnick et al. |
| 2018/0183827 A1 | 6/2018 | Zorlular et al. |
| 2018/0210464 A1* | 7/2018 | Switkes ............... G05D 1/0223 |
| 2018/0255077 A1 | 9/2018 | Paine |
| 2018/0255080 A1 | 9/2018 | Paine |
| 2018/0295154 A1 | 10/2018 | Crabtree et al. |
| 2018/0367548 A1 | 12/2018 | Stokes, III et al. |
| 2019/0052663 A1 | 2/2019 | Lee et al. |
| 2019/0052664 A1 | 2/2019 | Kibler et al. |
| 2019/0098032 A1* | 3/2019 | Murphey ............. H04L 63/145 |
| 2019/0132344 A1 | 5/2019 | Lem et al. |
| 2019/0141058 A1 | 5/2019 | Hassanzadeh et al. |
| 2019/0182119 A1 | 6/2019 | Ratkovic et al. |
| 2019/0188389 A1 | 6/2019 | Peled et al. |
| 2019/0230129 A1 | 7/2019 | Digiambattista et al. |
| 2019/0312898 A1 | 10/2019 | Verma et al. |
| 2019/0319987 A1 | 10/2019 | Levy et al. |
| 2019/0344477 A1* | 11/2019 | Huffa .................... B29B 11/16 |
| 2019/0362279 A1 | 11/2019 | Douglas |
| 2019/0373005 A1 | 12/2019 | Bassett |
| 2019/0379683 A1* | 12/2019 | Overby ............... H04W 12/122 |
| 2020/0014718 A1 | 1/2020 | Joseph Durairaj et al. |
| 2020/0042328 A1 | 2/2020 | Gupta |
| 2020/0042712 A1 | 2/2020 | Foo et al. |
| 2020/0045069 A1 | 2/2020 | Nanda et al. |
| 2020/0099704 A1 | 3/2020 | Lee et al. |
| 2020/0112487 A1 | 4/2020 | Inamdar et al. |
| 2020/0128047 A1 | 4/2020 | Biswas et al. |
| 2020/0137104 A1 | 4/2020 | Hassanzadeh et al. |
| 2020/0175175 A1 | 6/2020 | Hadar et al. |
| 2020/0177615 A1 | 6/2020 | Grabois et al. |
| 2020/0177616 A1 | 6/2020 | Hadar et al. |
| 2020/0177617 A1 | 6/2020 | Hadar et al. |
| 2020/0177618 A1 | 6/2020 | Hassanzadeh et al. |
| 2020/0177619 A1 | 6/2020 | Hadar et al. |
| 2020/0272972 A1 | 8/2020 | Harry et al. |
| 2020/0296137 A1 | 9/2020 | Crabtree et al. |
| 2020/0311630 A1 | 10/2020 | Risoldi et al. |
| 2020/0314141 A1* | 10/2020 | Vajipayajula ......... H04L 63/145 |
| 2020/0322369 A1* | 10/2020 | Raghuramu .......... H04L 63/102 |
| 2020/0351295 A1 | 11/2020 | Nhlabatsi et al. |
| 2020/0358804 A1 | 11/2020 | Crabtree et al. |
| 2021/0006582 A1 | 1/2021 | Yamada et al. |
| 2021/0014265 A1 | 1/2021 | Hadar et al. |
| 2021/0021636 A1* | 1/2021 | Sbandi ................ H04L 63/1466 |
| 2021/0092162 A1* | 3/2021 | Crabtree ............. H04L 63/1425 |
| 2021/0099490 A1 | 4/2021 | Crabtree et al. |
| 2021/0105294 A1 | 4/2021 | Kruse et al. |
| 2021/0168175 A1 | 6/2021 | Crabtree et al. |
| 2021/0173711 A1 | 6/2021 | Crabtree et al. |
| 2021/0218770 A1 | 7/2021 | Ben-Yosef et al. |
| 2021/0234882 A1* | 7/2021 | Lee ....................... G06T 15/005 |
| 2021/0248443 A1 | 8/2021 | Shu et al. |
| 2021/0273978 A1 | 9/2021 | Hadar et al. |
| 2021/0288995 A1 | 9/2021 | Attar et al. |
| 2021/0336981 A1 | 10/2021 | Akella et al. |

(56) References Cited

U.S. PATENT DOCUMENTS

| | | | |
|---|---|---|---|
| 2021/0352087 | A1* | 11/2021 | Ryver ................ H04L 63/1416 |
| 2021/0409426 | A1 | 12/2021 | Engelberg et al. |
| 2021/0409439 | A1 | 12/2021 | Engelberg et al. |
| 2022/0014445 | A1 | 1/2022 | Engelberg et al. |
| 2022/0014534 | A1 | 1/2022 | Basovskiy et al. |
| 2022/0021698 | A1 | 1/2022 | Hadar et al. |
| 2022/0038491 | A1 | 2/2022 | Hadar et al. |
| 2022/0051111 | A1 | 2/2022 | Hadar et al. |
| 2022/0070202 | A1 | 3/2022 | Busany et al. |
| 2022/0124115 | A1 | 4/2022 | Grabois et al. |
| 2022/0129590 | A1 | 4/2022 | Hadar et al. |
| 2022/0131894 | A1 | 4/2022 | Hassanzadeh et al. |
| 2022/0182406 | A1 | 6/2022 | Inokuchi |
| 2022/0188460 | A1 | 6/2022 | Hadar et al. |
| 2022/0263855 | A1 | 8/2022 | Engelberg et al. |
| 2022/0337617 | A1 | 10/2022 | Basovskiy et al. |
| 2023/0021961 | A1 | 1/2023 | Engelberg et al. |
| 2023/0034910 | A1 | 2/2023 | Engelberg et al. |
| 2023/0067128 | A1 | 3/2023 | Engelberg et al. |
| 2023/0067777 | A1 | 3/2023 | Hadar et al. |
| 2023/0076372 | A1 | 3/2023 | Engelberg et al. |
| 2024/0046804 | A1* | 2/2024 | Robinson ............ G08G 5/0069 |

FOREIGN PATENT DOCUMENTS

| | | |
|---|---|---|
| EP | 2385676 | 11/2011 |
| EP | 2816773 | 12/2014 |
| EP | 3644579 | 4/2020 |
| EP | 3664411 | 6/2020 |
| WO | WO 2018/002484 | 1/2018 |
| WO | WO 2020/242275 | 12/2020 |

OTHER PUBLICATIONS

Hadar, Ethan; Hassanzadeh, Amin. Big Data Analytics on Cyber Attack Graphs for Prioritizing Agile Security Requirements. 2019 IEEE 27th International Requirements Engineering Conference (RE). https://ieeexplore.ieee.org/stamp/stamp.jsp?tp=&arnumber=8920695 (Year: 2019).*

Dietz, Marietheres; Pernul, Gunther. Unleashing the Digital Twin's Potential for ICS Security. IEEE Security & Privacy, vol. 18, Issue: 4. https://ieeexplore.ieee.org/stamp/stamp.jsp?tp=&arnumber=8966454 (Year: 2020).*

Kaloroumakis et al., "Toward a Knowledge Graph of Cybersecurity Countermeasures," Technical Report, The MITRE Corporation, 2021, 11 pages.

MITRE.org [online], "D3FEND," available on or before Jun. 22, 2021 via Internet Archive: Wayback Machine URL<https://web.archive.org/web/20210622142005/https://d3fend.mitre.org/>, retrieved on Jul. 13, 2022, retrieved from URL<https://d3fend.mitre.org/>, 3 pages.

MITRE.org [online], "Digital Artifact Ontology," available on or before Jun. 25, 2021 via Internet Archive: Wayback Machine URL<https://web.archive.org/web/20210625024718/https://d3fend.mitre.org/dao>, retrieved on Jul. 13, 2022, retrieved from URL<https://d3fend.mitre.org/dao/>, 3 pages.

MITRE.org [online], "Service Application," available on or before Jun. 25, 2021 via Internet Archive: Wayback Machine URL<https://web.archive.org/web/20210625024952/https://d3fend.mitre.org/dao/artifact/d3f:ServiceApplication/>, retrieved on Jul. 13, 2022, retrieved from URL<https://d3fend.mitre.org/dao/artifact/d3f:ServiceApplication/>, 1 page.

Wikipedia.org [online], "Reachability," last updated Oct. 22, 2021, retrieved on Jul. 13, 2022, retrieved from URL<https://en.wikipedia.org/wiki/Reachability>, 5 pages.

3DS.com [online], "New Customer Experience," available on or before Aug. 7, 2020 via Internet Archive: Wayback Machine URL<https://web.archive.org/web/20200807204455/https://ifwe.3ds.com/transportation-mobility/new-customer-experience>, retrieved on Jul. 9, 2021, retrieved from URL<https://ifwe.3ds.com/transportation-mobility/new-customer-experience>, 9 pages.

Abraham et al., "Cyber Security Analytics: A Stochastic Model for Security Quantification Using Absorbing Markov Chains," Journal of Communications, Dec. 2014, 9(12):899-907.

Alvarenga et al., "Discovering Attack Strategies Using Process Mining," Presented at Proceedings of The Eleventh Advanced International Conference on Telecommunications, Brussels, Belgium, Jun. 21-26, 2015, 119-125.

Amar et al., "Using finite-state models for log differencing," Proceedings of the 2018 26th ACM Joint Meeting on European Software Engineering Conference and Symposium on the Foundations of Software Engineering (ESEC/FSE 2018), Lake Buena Vista, Florida, Nov. 4-9, 2018, 49-59.

Atoum et al., "A holistic cyber security implementation framework," Information Management & Computer Security, Jul. 2014, 22(3):251-264.

Barik et al., "Attack Graph Generation and Analysis Techniques," Defence Science Journal, Nov. 2016, 66(6):559-567.

Barrère et al., "Naggen: a Network Attack Graph GENeration Tool—IEE CNS 17 Poster," 2017 IEEE Conference on Communications and Network Security, Oct. 2017, Las Vegas, NV, USA, 378-379.

Bonacich, "Power and Centrality: A Family of Measures," American Journal of Sociology, Mar. 1987, 92(5):1170-1182.

Borgatti et al., "A Graph-theoretic perspective on centrality," Social Networks, Oct. 2006, 28(4):466-484.

Challenge.org [online], "Incorporating digital twin into internet cyber security—creating a safer future," May 2018, retrieved on Jul. 9, 2021, retrieved from URL<https://www.challenge.org/insights/digital-twin-cyber-security/>, 10 pages.

Chen et al., "Distributed Attack Modeling Approach Based on Process Mining and Graph Segmentation," Entropy, Sep. 2020, 22(9):1026, 21 pages.

Cohen-Addad et al., "Hierarchical Clustering: Objective Functions and Algorithms," Journal of the ACM, Jun. 2019, 66(4):26, 42 pages.

Coltellese et al., "Triage of IoT Attacks Through Process Mining." Presented at Proceedings of On the Move to Meaningful Internet Systems Conference 2019, Rhodes, Greece, Oct. 21-25, 2019: Lecture Notes in Computer Science, Oct. 2019, 11877:326-344.

EP Extended Search Report in European Appln. No. 21191752.1, dated Jan. 4, 2022, 8 pages.

EP Search Report in European Application No. EP 19212981, dated Mar. 4, 2020, 6 pages.

EP Search Report in European Application No. EP13290145, dated Nov. 12, 2013, 2 pages.

EP Search Report in European Application No. EP19212974, dated Feb. 14, 2020, 8 pages.

EP Search Report in European Application No. EP19212976, dated Feb. 14, 2020, 8 pages.

EP Search Report in European Application. No. 21159421.3, dated Jun. 30, 2021, 11 pages.

EP Search Report in European Application. No. EP20185251, dated Oct. 21, 2020, 7 pages.

Fielder et al., "Decision support approaches for cyber security investment," Decision Support Systems, Jun. 2016, 86:13-23.

Foundations of Databases, 1st ed., Abiteboul et al. (eds.), 1995, Chapter 12, 38 pages.

Fundamentals of Business Process Management, 2nd ed., Dumas et al. (eds.), 2018, 546 pages.

GE.com [online], "Predix Platform," available on or before Nov. 16, 2018 via Internet Archive: Wayback Machine URL<https://web.archive.org/web/20181116005032/https://www.ge.com/digital/iiot-platform>, retrieved on Jul. 9, 2021, retrieved from URL<https://www.ge.com/digital/iiot-platform>, 6 pages.

Gergeleit et al., "Modeling Security Requirements and Controls for an Automated Deployment of Industrial IT Systems," Kommunikation und Bildverarbeitung in der Automation. Technologien für die intelligente Automation (Technologies for Intelligent Automation), Jan. 14, 2020, 12:217-231.

(56) References Cited

OTHER PUBLICATIONS

Grieves, "Virtually Intelligent Product Systems: Digital and Physical Twins", Complex Systems Engineering: Theory and Practice, Jul. 2019, 256:175-200.
Hadar et al., "Big Data Analytics on Cyber Attack Graphs for Prioritizing Agile Security Requirements", Proceedings of the 2019 IEEE 27th International Requirements Engineering Conference, Sep. 23-27, 2019, Jeju Island, Kora, 330-339.
Hadar et al., "Cyber Digital Twin Simulator for Automatic Gathering and Prioritization of Security Controls Requirements," Proceedings of the 2020 IEEE 28th International Requirements Engineering Conference, Aug. 31-Sep. 4, 2020, Zurich, Switzerland, 250-259.
Hansen et al., "Model-in-the-Loop and Software-in-the-Loop Testing of Closed-Loop Automotive Software with Arttest," Informatik, 2017, 13 pages.
Hasan et al., "Towards Optimal Cyber Defense Remediation in Energy Delivery Systems", Proceedings of 2019 IEEE Global Communications Conference, Dec. 9-13, 2019, Waikoloa, Hawaii, 7 pages.
Hofner et al., "Dijkstra, Floyd and Warshall meet Kleene," Formal Aspects of Computing, Jul. 2012, 24(4-6):459-476.
Husák et al., "Survey of Attack Projection, Prediction, and Forecasting in Cyber Security:" IEEE Communications Surveys & Tutorials, Sep. 24, 2018, 21(1):640-660.
Idika et al., "Extending attack graph-based security metrics and aggregating their application," IEEE Transactions on Dependable and Secure Computing, Jan./Feb. 2012, 9(1):75-85.
IEEE, "IEEE Standard for extensible Event Stream (XES) for Achieving Interoperability in Event Logs and Event Stream," IEEE Std 1849™-2016, Sep. 22, 2016, 50 pages.
IEEE.org [online], "This Car Runs on Code," Feb. 1, 2009, retrieved on Jul. 9, 2021, retrieved from URL<https://spectrum.ieee.org/transportation/systems/this-car-runs-on-code>, 5 pages.
Ingols et al., "Practical Attack Graph Generation for Network Defense," 2006 22nd Annual Computer Security Applications Conference (ACSAC'06), Miami Beach, Florida, Dec. 11-15, 2006, 10 pages.
International Organization for Standardization, "International Standard: ISO/IEC 27001," ISO/IEC 27001:2013(E), Oct. 1, 2013, 29 pages.
Joint Task Force Transformation Initiative, "Security and Privacy Controls for Federal Information Systems and Organizations," National Institute of Standards and Technology Special Publication 800-53, Revision 4, Jan. 22, 2015, 462 pages.
Khouzani et al., "Scalable min-max multi-objective cyber-security optimization over probabilistic attack graphs", European Journal of Operational Research, Nov. 1, 2019, 278(3):894-903.
Li et al., "Cluster security research involving the modeling of network exploitations using exploitation graphs," Proceedings of the IEEE International Symposium on Cluster Computing and the Grid, Singapore, May 16-19, 2006, 11 pages.
Lippmann et al., "Validating and restoring defense in depth using attack graphs," Proceedings of the Military Communications Conference, Washington, DC, USA, Oct. 23-25, 2006, 10 pages.
Lu et al., "Ranking attack graphs with graph neural networks," Proceedings of the 5th International Conference on Information Security Practice and Experience, Xi'an, China, Apr. 13-15, 2009; Lecture Notes in Computer Science, Apr. 2009, 5451:345-359.
Manning Free Content Center [online], "Building Your Vocabulary," dated May 19, 2017, retrieved on Jun. 3, 2020, retrieved from URL <https://freecontent.manning.com/building-your-vocabulary/>, 10 pages.
MaschinenMarkt.international [online], "Digital twin in the automobile industry," Aug. 1, 2019, retrieved on Jul. 9, 2021, retrieved from URL<https://www.maschinenmarkt.international/digital-twin-in-the-automobile-industry-a-851549/>, 3 pages.
Mashable.com [online], "Ford ready to innovate, but not at the expense of customer needs," May 31, 2016, retrieved on Jul. 9, 2021, retrieved from URL<https://mashable.com/article/mark-fields-ford-codecon>, 7 pages.
Mehta et al., "Ranking attack graphs," Proceedings of the International Conference on Recent Advances in Intrusion Detection, Hamburg, Germany, Sep. 20-22, 2006; Lecture Notes in Computer Science, Sep. 2006, 4219:127-144.
Murata, "Petri Nets: Properties, Analysis and Applications," Proceedings of the IEEE, Apr. 1989, 77(4):541-580.
Narmeen Zakaria Bawany; DDOS Attack Detection and Mitigation Using SDN: Methods, Practices, and Solutions; SPRINGER-2017; p. 425-441.
National Institute of Standards and Technology [online], "National Vulnerability Database," last updated Jun. 2, 2020, retrieved on Jun. 3, 2020, retrieved from URL<https://nvd.nist.gov/>, 4 pages.
Neo4j.com [online], "Random Walk," available on or before Aug. 6, 2020 via Internet Archive: Wayback Machine URL<https://web.archive.org/web/20200806193136/https://neo4j.com/docs/graph-data-science/current/alpha-algorithms/random-walk/>, retrieved on Jul. 28, 2021, retrieved from URL<https://neo4j.com/docs/graph-data-science/current/alpha-algorithms/random-walk/>, 7 pages.
Neo4j.com [online], "Yen's K-Shortest Paths," available on or before Aug. 6, 2020 via Internet Archive: Wayback Machine URL<https://web.archive.org/web/20200806185626/https://neo4j.com/docs/graph-data-science/current/alpha-algorithms/yen-s-k-shortest-path/, retrieved on Jul. 28, 2021, retrieved from URL<https://web.archive.org/web/20200806185626/https://neo4j.com/docs/graph-data-science/current/alpha-algorithms/yen-s-k-shortest-path/>, 5 pages.
Networks: An Introduction, Newman (ed.), May 2010, 789 pages.
Noel et al., "CyGraph: Graph-Based Analytics and Visualization for Cybersecurity," Handbook of Statistics, Jan. 2016, 35:117-167.
Ortalo et al., "Experimenting with quantitative evaluation tools for monitoring operational security," IEEE Transactions on Software Engineering, Sep./Oct. 1999, 25(5):633-650.
Ou et al., "A Scalable Approach to Attack Graph Generation," Proceedings of the 13th ACM Conference on Computer and Communication Security, Oct. 2006, 336-345.
Ou et al., "MulVAL: A Logic-based Network Security Analyzer," 14th USENIX Security Symposium, Aug. 2005, Baltimore, MD, USA, 16 pages.
Phillips et al., "A graph-based system for network-vulnerability analysis," Proceedings of the 1998 Workshop on New Security Paradigms, Charlottesville, Virginia, Sep. 22-26, 1998, 71-79.
PM4Py.de [online], "DFG: Process Discovery using Directly-Follows Graphs," available on or before Mar. 7, 2019 via Internet Archive: Wayback Machine URL<https://web.archive.org/web/20190307062454/http://pm4py.pads.rwth-aachen.de/documentation/process-discovery/dfg/>, retrieved on Jul. 28, 2021, retrieved from URL<https://web.archive.org/web/20190307062454/http://pm4py.pads.rwth-aachen.de/documentation/process-discovery/dfg/>, 4 pages.
PM4Py.de [online], "Process Discovery," available on or before Jun. 26, 2020 via Internet Archive: Wayback Machine URL<https://web.archive.org/web/20200626094921/https://pm4py.fit.fraunhofer.de/documentation#discovery>, retrieved on Jul. 28, 2021, retrieved from URL:https://pm4py.fit.fraunhofer.de/documentation#discovery>, 5 pages.
Process Mining, Ist ed., van der Aalst, 2011, Chapters 5-6, 63 pages.
Purvine et al., "A Graph-Based Impact Metric for Mitigating Latheral Movement Cyber Attacks", Automated Descision Making for Active Cyber Defence, Oct. 2016, pp. 45-52.
Q. Liu et al., "Latte: Large-Scale Lateral Movement Detection," MILCOM 2018—2018 IEEE Military Communications Conference (MILCOM), 2018, pp. 1-6, doi: 10.1109/MILCOM.2018.8599748. (Year: 2018).
Schatz et al., "Economic valuation for information security investment: a systematic literature review," Information Systems Frontiers, Apr. 18, 2016, 19:1205-1228.
Shandilya et al., "Use of Attack Graphs in Security Systems", Hindawi Journal of Computer Networks and Communications, Oct. 20, 2014, 2014:818957, 14 pages.

(56) References Cited

OTHER PUBLICATIONS

Shi et al., "Normalized Cuts and Image Segmentation," IEEE Transactions on Pattern Analysis and Machine Intelligence, Aug. 2000, 22(8):888-905.
Siemens.com [online], "From vehicle design to multi-physical simulations," available on or before Jul. 26, 2019 via Internet Archive: Wayback Machine URL<https://web.archive.org/web/20190726044643/https://new.siemens.com/global/en/markets/automotive-manufacturing/digital-twin-product.html>, retrieved on Jul. 9, 2021, retrieved from URL<https://new.siemens.com/global/en/markets/automotive-manufacturing/digital-twin-product.html>, 11 pages.
SMMT.co.uk [online], "Role of Digital Twin in Automotive Industry," Dec. 17, 2018, retrieved on Jul. 9, 2021, retrieved from URL<https://www.smmt.co.uk/2018/12/role-of-digital-twin-in-automotive-industry/>, 9 pages.
Sourceforge.net [online], "XSB," last updated Oct. 29, 2017, retrieved on Jun. 3, 2020, retrieved from URL <http://xsb.sourceforge.net/>, 2 pages.
Stanek et al., "Method of comparing graph differencing algorithms for software differencing," 2008 IEEE International Conference on Electro/Information Technology, Ames, Iowa, May 18-20, 2008, 482-487.
Strom et al., "MITRE ATT&CK™: Design and Philosophy", The MITRE Corporation, Jul. 2018, 37 pages.
Swiler et al., "A graph-based network-vulnerability analysis system," Sandia National Laboratories, 1997, Tech, Rep. SAND97-3010/1, 25 pages.
TechCrunch.com [online], "Tesla is rolling out its Navigate on Autopilot feature," Oct. 27, 2018, retrieved on Jul. 9, 2021, retrieved from URL<https://techcrunch.com/2018/10/26/tesla-is-rolling-out-its-navigate-on-autopilot-feature/>, 17 pages.
The Fourth Industrial Revolution, Ist. ed., Schwab, Jan. 2017, 218 pages.
The MITRE Corporation [online], "MITRE ATT&CK," last updated May 27, 2020, retrieved on Jun. 3, 2020, retrieved from URL <https://attack.mitre.org/>, 3 pages.
Ullah et al., "Towards Modeling Attacker's Opportunity for Improving Cyber Resilience in Energy Delivery Systems", Resilience Week, Aug. 2018, pp. 100-107.
Van Der Aalst et al., "Causal Nets: A Modeling Language Tailored towards Process Discovery," Presented at Proceedings of CONCUR 2011—Concurrency Theory, Aachen, Germany, Sep. 6-9, 2011; Lecture Notes in Computer Science, Sep. 2011, 6901:28-42.
Vehicle Power Management, Ist ed., Zhang et al.(eds.), Aug. 2011, Chapter 10, 27 pages.
Wang et al., "A Network Vulnerability Assessment Method Based on Attack Graph," 2018 IEEE 4th International Conference on Computer and Communications, Dec. 7-10, 2018, Chengdu, China, 1149-1154.
Wang et al., "Exploring Attack Graph for Cost-benefit Security Hardening: A Probabilistic Approach," Computers & Security, Feb. 2013, 32:158-169.
Ward et al., "Threat Analysis and Risk Assessment in Automotive Cyber Security," SAE Int. J. Passeng. Cars Electron. Electr. Systems, May 2013, 6(2):507-513.
Wikipedia.org [online], "5G," last updated Jul. 9, 2021, retrieved on Jul. 9, 2021, retrieved from URL<https://en.wikipedia.org/wiki/5G>, 29 pages.
Wikipedia.org [online], "Active Directory," last updated Jun. 1, 2020, retrieved on Jun. 3, 2020, retrieved from URL <https://en.wikipedia.org/wiki/Active_Directory>, 14 pages.
Wikipedia.org [online], "Backward Chaining," last updated Nov. 16, 2019, retrieved on Jun. 3, 2020, retrieved from URL <https://en.wikipedia.org/wiki/Backward_chaining>, 3 pages.
Wikipedia.org [online], "Breadth-first search," last updated Jul. 21, 2021, retrieved on Jul. 28, 2021, retrieved from URL<https://en.wikipedia.org/wiki/Breadth-first_search>, 6 pages.
Wikipedia.org [online], "Cartesian Product," last updated Feb. 28, 2020, retrieved on Jun. 3, 2020, retrieved from URL <https://en.wikipedia.org/wiki/Cartesian_product>, 9 pages.
Wikipedia.org [online], "Centrality," last updated May 29, 2020, retrieved on Jun. 3, 2020, retrieved from URL <https://en.wikipedia.org/wiki/Centrality>, 15 pages.
Wikipedia.org [online], "Centrality," last updated Oct. 18, 2020, retrieved on Oct. 26, 2020, retrieved from URL<https://en.wikipedia.org/wiki/Centrality>, 15 pages.
Wikipedia.org [online], "Common Vulnerabilities and Exposures," last updated Jul. 6, 2021, retrieved on Jul. 9, 2021, retrieved from URL<https://en.wikipedia.org/wiki/Common_Vulnerabilities_and_Exposures>, 5 pages.
Wikipedia.org [online], "Common Vulnerability Scoring System," last updated Jun. 21, 2021, retrieved on Jul. 9, 2021, retrieved from URL-https://en.wikipedia.org/wiki/Common_Vulnerability_Scoring_System>, 7 pages.
Wikipedia.org [online], "Depth-first search," last updated Jun. 16, 2021, retrieved on Jul. 28, 2021, retrieved from URL<https://en.wikipedia.org/wiki/Depth-first_search>, 8 pages.
Wikipedia.org [online], "Digital twin," last updated Jul. 8, 2021, retrieved on Jul. 9, 2021, retrieved from URL<https://en.wikipedia.org/wiki/Digital_twin>, 13 pages.
Wikipedia.org [online], "Eigenvector centrality," last updated Dec. 1, 2020 retrieved on Jan. 11, 2021, retrieved from URL<https://en.wikipedia.org/wiki/Eigenvector_centrality>, 4 pages.
Wikipedia.org [online], "Flood Fill," last updated Dec. 24, 2019, retrieved on Jun. 3, 2020, retrieved from URL <https://en.wikipedia.org/wiki/Flood_fill>, 7 pages.
Wikipedia.org [online], "Floyd-Warshall algorithm," last updated Jan. 5, 2021, retrieved on Jan. 11, 2021, retrieved from URL<https://en.wikipedia.org/wiki/Floyd%E2%80%93Warshall_algorithm>, 7 pages.
Wikipedia.org [online], "Forward Chaining," last updated Nov. 18, 2019, retrieved on Jun. 3, 2020, retrieved from URL <https://en.wikipedia.org/wiki/Forward_chaining>, 3 pages.
Wikipedia.org [online], "Look-ahead (backtracking)," last updated May 23, 2020, retrieved on Jun. 3, 2020, retrieved from URL <https://en.wikipedia.org/wiki/Look-ahead_(backtracking)>, 3 pages.
Wikipedia.org [online], "SCADA," last updated Jun. 2, 2020, retrieved on Jun. 3, 2020, retrieved from URL <https://en.wikipedia.org/wiki/SCADA>, 12 pages.
Wikipedia.org [online], "Sigmoid function," last updated Dec. 25, 2020, retrieved on Jan. 11, 2021, retrieved from URL<https://en.wikipedia.org/wiki/Sigmoid_function>, 4 pages.
Wikipedia.org [online], "SWOT analysis," last updated Oct. 20, 2020, retrieved on Oct. 26, 2020, retrieved from URL<https://en.wikipedia.org/wiki/SWOT_analysis>, 8 pages.
Wikipedia.org [online], "Traffic congestion," last updated Oct. 5, 2020, retrieved on Oct. 26, 2020, retrieved from URL<https://en.wikipedia.org/wiki/Traffic_congestion>, 24 pages.
Wikipedia.org [online], "Traffic flow," last updated Oct. 19, 2020, retrieved on Oct. 26, 2020, retrieved from URL:https://en.wikipedia.org/wiki/Traffic_flow>, 41 pages.
Wikipedia.org [online], "Zero-day (computing)," last updated Oct. 16, 2020, retrieved on Oct. 26, 2020, retrieved from URL:https://en.wikipedia.org/wiki/Zero-day (computing)>, 8 pages.
X. Li, C. Zhang, T. Jung, J. Qian and L. Chen, "Graph-based privacy-preserving data publication," IEEE Infocom 2016—The 35th Annual IEEE International Conference on Computer Communications, 2016, pp. 1-9, doi: 10.1109/IN F000M.2016.7524584. (Year: 2016).
Xie et al., "Using Bayesian Networks for Cyber Security Analysis," Proceedings of the 2010 IEEE/IFIP International Conference on Dependable Systems & Networks, Jun. 28-Jul. 1, 2010, Chicago, Illinois, 211-220.
Yi et al., "Overview on attack graph generation and visualization technology," 2013 International Conference on Anti-Counterfeiting, Security and Identification (ASID), Shanghai, China, Oct. 25-27, 2013, 6 pages.
You et al., "A Review of Cyber Security Controls from An ICS Perspective," Proceedings of 2018 International Conference on Platform Technology and Service (PlatCon), Jan. 29-31, 2018, Jeju, South Korea, 5 pages.

(56) References Cited

OTHER PUBLICATIONS

Zeng et al., "Survey of Attack Graph Analysis Methods from the Perspective of Data and Knowledge Processing," Hindawi Security and Communication Networks, Dec. 26, 2019, 2019:2031063, 17 pages.
Zhang et al., "Co-simulation framework for design of time-triggered cyber physical systems," 2013 ACM/IEEE International Conference on Cyber-Physical Systems (ICCPS), Philadelphia, Pennsylvania, Apr. 8-11, 2013, 119-128.
Zhang et al., "Optimal Decision-Making Approach for Cyber Security Defense Using Game Theory and Intelligent Learning," Security and Communication Networks, Dec. 23, 2019, 2019:3038586, 17 pages.
Zhao et al., "Attack graph analysis method for large scale network security hardening," J. Front. Comput. Sci. Technology, 2018, 12(2):263-273 (with English Abstract).
Abraham et al. "A Predictive Framework for Cyber Security Analytics Using Attack Graphs." International Journal of Computer Networks & Communications (IJCNC). Vol. 7, No. 1, Jan. 2015. (Year: 2015).
Chen Zhong, Towards Agile Cyber Analysis: Leveraging Visualization as Functions in Collaborative Visual Analytics, IEEE:2017, pp. 1-2.
EP Extended Search Report in European Appln. No. 22187514.9, dated Nov. 29, 2022, 7 pages.
EP Extended Search Report in European Appln. No. 22193272.6, dated Jan. 25, 2023, 8 pages.
CyberSecurity Works.com [online], "MITRE Mapping of CISA KEVs and its Challenges," Jun. 29, 2022, retrieved on Oct. 4, 2022, retrieved from URL<https://cybersecurityworks.com/blog/cisa/mitre-mapping-of-cisa-kevs-and-its-challenges.html>, 6 pages.
Cycognito.com [online], "Identifying and Managing Vulnerabilities on All Your Attacker-Exposed Assets, All the Time: Benefits of the CyCognito Platform for Vulnerability Management," available on or before Oct. 22, 2020 via Internet Archive: Wayback Machine URL<https://web.archive.org/web/20201022120625/https://www.cycognito.com/vuln erability-management>, retrieved on Oct. 4, 2022, retrieved from URL<https://www.cycognito.com/vulnerability-management>, 15 pages.
Das et al., "V2W-BERT: A Framework for Effective Hierarchical Multiclass Classification of Software Vulnerabilities," CoRR, submitted on Feb. 23, 2021, arXiv:2102.11498v1, 11 pages.
GitHub.com [online], "ALFA-group/BRON," available on or before Nov. 23, 2021 via Internet Archive: Wayback Machine URL<https://web.archive.org/web/20211123023700/https://github.com/ALFA-group/BRON>, retrieved on Oct. 4, 2022, retrieved from URL<https://github.com/ALFA-group/BRON>, 5 pages.
Grigorescu et al., "CVE2ATT&CK: BERT-Based Mapping of CVEs to MITRE ATT&CK Techniques," Algorithms, Aug. 31, 2022, 15(9):314, 22 pages.
Mitre.org [online], "CAPEC: Common Attack Pattern Enumerations and Classifications," available on or before Jul. 21, 2007 via Internet Archive: Wayback Machine URL<https://web.archive.org/web/20070721234158/https://capec.mitre.org/>, retrieved on Oct. 4, 2022, retrieved from URL<https://capec.mitre.org/>, 2 pages.
Mitre.org [online], "CWE: Common Weakness Enumeration," available on or before Oct. 9, 2006 via Internet Archive: Wayback Machine URL<https://web.archive.org/web/20061009060144/https://cwe.mitre.org/>, retrieved on Oct. 4, 2022, retrieved from URL<https://cwe.mitre.org/>, 1 page.
W3.org [online], "SWRL: A Semantic Web Rule Language Combining OWL and RuleML," May 21, 2004, retrieved on Oct. 4, 2022, retrieved from URL<https://www.w3.org/Submission/SWRL/>, 24 pages.
Brazhuk, "Towards automation of threat modeling based on a semantic model of attack patterns and weaknesses," arXiv, Dec. 8, 2021, arXiv:2112.04231v1, 14 pages.
EP Extended Search Report in European Appln. No. 22157487.4, dated Jun. 9, 2022, 10 pages.

Hemberg et al., "BRON—Linking Attack Tactics, Techniques, and Patterns with Defensive Weaknesses, Vulnerabilities and Affected Platform Configurations," arXiv, Oct. 1, 2020, arXiv:2010.00533v1, 14 pages.
Hemberg et al., "Using a Collated Cybersecurity Dataset for Machine Learning and Artificial Intelligence," arXiv, Aug. 5, 2021, arXiv:2108.02618v1, 5 pages.
Horrocks et al., "SWRL: A Semantic Web Rule Language Combining OWL and RuleML," W3C Member Submission, May 21, 2004, 24 pages.
Neo4j.com [online], "Topological link prediction," available on or before May 17, 2020, via Internet Archive: Wayback Machine URL<https://web.archive.org/web/20200517111258/https://neo4j.com/docs/graph-data-science/current/algorithms/linkprediction/>, retrieved on Jun. 14, 2022, retrieved from URL<https://neo4j.com/docs/graph-data-science/current/algorithms/linkprediction/>, 2 pages.
Rossi et al., "Knowledge Graph Embedding for Link Prediction: A Comparative Analysis," arXiv, Feb. 3, 2020, arXiv:2002.00819v1, 42 pages.
Wikipedia.org [online], "Natural language processing," last updated Jun. 10, 2022, retrieved on Jun. 14, 2022, retrieved from URL<https://en.wikipedia.org/wiki/Natural_language_processing>, 13 pages.
Almeida et al., "An ontological analysis of the notion of community in the RM-ODP enterprise language," Computer Standards & Interfaces, Mar. 2013, 35(3):257-268.
Annane et al., "BBO: BPMN 2.0 based ontology for business process representation," Presented at Proceedings of the 20th European Conference on Knowledge Management (ECKM 2019), Lisbonne, Portugal, Sep. 5-6, 2019, 49-59.
Ashton et al., "That 'internet of things' thing," RFID Journal, Jun. 22, 2009, 1 page.
Borgo et al., "Ontological Foundations of DOLCE," Theory and Applications of Ontology: Computer Applications, Aug. 5, 2010, 279-295.
Burger et al., "Scaling to the end of silicon with edge architectures," Computer, Jul. 2004, 37(7):44-55.
Cravero, "Big data architectures and the internet of things: A systematic mapping study," IEEE Latin America Transactions, Apr. 2018, 16(4):1219-1226.
Daniele et al., "An ontological approach to logistics," Enterprise Interoperability: Research and Applications in the Service-oriented Ecosystem, Oct. 11, 2013, 199-213.
Degen et al., "Gol: toward an axiomatized upper-level ontology," Presented at Proceedings of the International Conference on Formal Ontology in Information Systems, Ogunquit, Maine, USA, Oct. 17-19, 2001, 34-46.
Duarte et al., "Towards an Ontology of Requirements at Runtime," Formal Ontology in Information Systems, Jan. 2016, 283:255-268.
El Saddik, "Digital Twins: The Convergence of Multimedia Technologies," IEEE MultiMedia, Apr.-Jun. 2018, 25(2):87-92.
Gailly et al., "Ontological Reengineering of the REA-EO using UFO," Presented at Proceedings of the International Workshop on Ontology-Driven Software Engineering, Orlando, FL, USA, Oct. 2009, 15 pages.
Gandomi et al., "Beyond the hype: Big data concepts, methods, and analytics," International Journal of Information Management, Apr. 2015, 35(2):137-144.
Genovese, "Data mesh: the newest paradigm shift for a distributed architecture in the data world and its application," Thesis for the degree of Computer Engineering, Politecnico di Torino, 2021, 76 pages.
Giunchiglia et al., "Lightweight Ontologies," Technical Report DIT-07-071, University of Trento, Oct. 2007, 10 pages.
Gomez-Perez et al., "Ontology languages for the Semantic Web," IEEE Intelligent Systems, Feb. 2002, 17(1):54-60.
Guarino, "Formal Ontology in Information Systems," Presented at Proceedings of the 1st International Conference, Trento, Italy, Jun. 6-8, 1998, 3-15.
Guizzardi et al., "An Ontology-Based Approach for Evaluating the Domain Appropriateness and Comprehensibility Appropriateness of Modeling Languages," MODELS, 2005, 691-705.
Guizzardi, "On Ontology, ontologies, Conceptualizations, Modeling Languages, and (Meta)Models," Presented at Proceedings of the

(56) References Cited

OTHER PUBLICATIONS 2007 conference on Databases and Information Systems IV: Selected Papers from the Seventh International Baltic Conference, Amsterdam, Netherlands, Jun. 5, 2007, 18 pages.

Guizzardi, "Ontological Foundations for Structural Conceptual Models," Thesis for the degree of Doctor, University of Twente, 2005, 441 pages.

Guizzardi, "Ontology, Ontologies and the "I" of FAIR," Data Intelligence, Jan. 1, 2020, 2(1-2):181-191.

Guizzardi, "The role of foundational ontology for conceptual modeling and domain ontology representation," Presented at Proceedings of the 7th International Baltic Conference on Databases and Information Systems, Vilnius, Lithuania, Jul. 3-6, 2006, 9 pages.

Hassani et al., "Artificial Intelligence (AI) or Intelligence Augmentation (IA): What Is the Future?," AI, Apr. 12, 2020, 1(2):143-155.

Herre, "General Formal Ontology (GFO): A Foundational Ontology for Conceptual Modelling," Theory and Applications of Ontology: Computer Applications, Aug. 12, 2010, 297-345.

Jacobsen et al., "FAIR Principles: Interpretations and Implementation Considerations," Data Intelligence, Jan. 1, 2020, 2(1-2):10-29.

Machado et al., "Data Mesh: Concepts and Principles of a Paradigm Shift in Data Architectures," Procedia Computer Science, 2022, 196:263-271.

Machado et al., "Data-Driven Information Systems: The Data Mesh Paradigm Shift," Presented at Proceedings of the 29th International Conference on Information Systems Development, Valencia, Spain, Sep. 8-10, 2021, 6 pages.

Makridakis, "The forthcoming artificial intelligence (ai) revolution: Its impact on society and firms," Futures, Jun. 2017, 90:46-60.

Martins et al., "A framework for conceptual characterization of ontologies and its application in the cybersecurity domain," Software and Systems Modeling, Jul. 2, 2022, 21:1437-1464.

Martins et al., "Conceptual Characterization of Cybersecurity Ontologies," The Practice of Enterprise Modelling, Nov. 18, 2020, 323-338.

Mathis, "Data lakes," Datenbank-Spektrum, Oct. 6, 2017, 17(3):289-293.

Monino, "Data Value, Big Data Analytics, and Decision-Making," Journal of the Knowledge Economy, Aug. 20, 2016, 256-267.

Sales et al., "Ontological anti-patterns in taxonomic structures," Presented at Proceedings of ONTOBRAS 2019: XII Seminar on Ontology Research in Brazil, Porto Alegre, Brazil, Sep. 2-5, 2019, 13 pages.

Sitton-Candanedo et al., "A review of edge computing reference architectures and a new global edge proposal," Future Generation Computer Systems, Oct. 2019, 99:278-294.

Tan et al., "Future internet: The Internet of Things," Presented at Proceedings of the 2010 3rd International Conference on Advanced Computer Theory and Engineering (ICACTE), Chengdu, China, Aug. 20-22, 2010.

Uschold et al., "Ontologies: Principles, methods and applications," The Knowledge Engineering Review, Jan. 1996, 11(2):93-136.

Van Heijst et al., "Using explicit ontologies in KBS development," International Journal of Human-Computer Studies, Feb. 1997, 46(2-3):183-292.

Wand et al., "On the deep structure of information systems," Information Systems Journal, Jul. 1995, 5(3):203-223.

Wang et al., "Big data analytics in cyber security: network traffic and attacks," Journal of Computer Information Systems, Jan. 2020, 61(3):1-8.

Wu et al., "A service-oriented architecture for business intelligence," Presented at Proceedings of the IEEE International Conference on Service-Oriented Computing and Applications (SOCA '07), Newport Beach, CA, USA, Jun. 19-20, 2007, 279-285.

\* cited by examiner

CYBER DIGITAL TWIN SIMULATOR FOR AUTOMOTIVE SECURITY ASSESSMENT BASED ON ATTACK GRAPHS

CROSS-REFERENCE TO RELATED APPLICATION

This application claims the benefit of U.S. Application No. 63/111,884, filed Nov. 10, 2020, which is incorporated by reference in its entirety.

BACKGROUND

The automotive industry is rapidly transforming into becoming an integral part of the 'Internet of Things' (IoT) ecosystem. As a member of the IoT ecosystem, the automotive industry harnesses agility and flexibility as part of its vehicle development and ongoing maintenance for vehicles delivered to purchasers. Such flexibility can be achieved due to the digital transformation of the automotive industry with the move to so-called connected vehicles, each of which can execute millions of lines of code (e.g., upwards of 150 million lines of code). Connected vehicles each include a multitude of in-vehicle components, at least some of which communicate with one another (C2C), with other vehicles (V2V), with other systems in an infrastructure (V2X) (e.g., vehicles communicating with transport infrastructure), and/or with other networks (V2N).

With such a multitude of internal systems and connectivity across multiple channels (e.g., C2C, V2V, V2X, V2N), a plethora of attack surfaces become available for malicious users (e.g., hackers) to exploit connected vehicles. For OEMs and enterprise fleet management teams, monitoring and continuously managing the secure posture of the vehicles is expected. Such monitoring and managing of security can also be mandatory in view of governmental regulations (e.g., to mitigate risk to human lives both within the vehicle and the vehicle's surroundings, as well as to risk to private data of vehicle owners and/or passengers).

While there exist ways of identifying and mitigating risks and vulnerabilities of individual components within connected vehicles, the methodology of achieving it is mainly dependent on manual testing and audits of each in-vehicle component individually. For each component, these manual tests and audits can be described as 'black box' due to the lack of visibility of the component provided by suppliers, which is integrated into the vehicle by the OEM. This process makes the cost of vulnerability identification and remediation extremely expensive in terms of time, money, and technical resources (e.g., processing power, memory). This makes it infeasible to catch up with vulnerabilities arising as a result of frequent changes applied to vehicles (e.g., software updates to individual systems). For example, new vulnerabilities, attack techniques, and threat intelligence constantly emerge and evolve. Mapping these new potential threats to physical assets, to check their relevancy and potential impact is a challenge. More plainly stated, there is no clear framework for, in terms of cyber-security, assessing risks to and attacks on connected vehicles in a standardized industry accepted manner within the connected vehicle ecosystem.

SUMMARY

Implementations of the present disclosure are directed to a connected vehicle cyber-security platform. More particularly, implementations of the present disclosure are directed to a connected vehicle cyber-security platform that leverages digital twins across multiple layers of the connected vehicle ecosystem and generates analytical attack graphs (AAGs) based on digital twins to evaluate vulnerabilities and remedies within the connected vehicle ecosystem.

In some implementations, simulation and evaluation of a connected vehicle ecosystem using one or more AAGs is provided, each AAG representative of potential lateral movement within the connected vehicle ecosystem. In some implementations, actions include determining a set of components within the connected vehicle ecosystem, components within the set of components representing at least one layer within the connected vehicle ecosystem, for each component in the set of components: providing a set of facts representative of the respective component, and providing a component digital twin using the set of facts, defining a set of digital twins including digital twins of components in the set of components, generating, using the set of digital twins, at least one AAG representative of potential lateral movement between components of the at least one layer within the connected vehicle ecosystem, the at least one AAG representing a contextual digital twin of components operating within the connected vehicle ecosystem, and evaluating the connected vehicle ecosystem using the at least one AAG. Other implementations of this aspect include corresponding systems, apparatus, and computer programs, configured to perform the actions of the methods, encoded on computer storage devices.

These and other implementations can each optionally include one or more of the following features: the set of components includes a first sub-set of components representative of components of a vehicle and a second sub-set of components representative of components of an infrastructure; each component includes software executed within a layer of the connected vehicle ecosystem; the software is binary firmware; the set of facts includes one or more of a software bill of materials (SBOM), operating system and kernel configuration, application configuration, network interfaces, local interfaces, control flow representation, data flow representation, encryption mechanisms, encryption keys, encryption flows, memory management, memory mapping, application programming interfaces (APIs) status, application frameworks, application framework configurations, peripheral components, and peripheral component integrations; the at least one AAG is generated using a set of rules, the set of rules defining conditions, in which components in the set of components can communicate with one another based on one or more facts in the set of facts; evaluating one or more of vulnerabilities and remedial measures within the connected vehicle ecosystem using the at least one AAG comprises determining a risk value based on the at least one AAG, and selectively adjusting one or more remedial measures within the connected vehicle ecosystem in an effort to mitigate risk in response to the risk value; the at least one AAG includes one or more nested AAGs therein; at least one nested AAG represents a vehicle within the connected vehicle ecosystem; providing a set of facts representative of the respective component includes executing binary code analysis to define the set of facts; providing a set of facts representative of the respective component includes receiving data representative of one or more of a source file, an internet protocol (IP) address, a port, a protocol, a header file, a functions name, a memory structure, and memory allocations; and evaluating the connected vehicle ecosystem using the at least one AAG comprises on or more of: evaluating one or more of vulnerabilities and remedial measures within the connected vehicle ecosystem, evaluating risk to one or more processes executed within the connected vehicle ecosystem, optimizing investment of entities comprising one or more components within the connected vehicle ecosystem.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
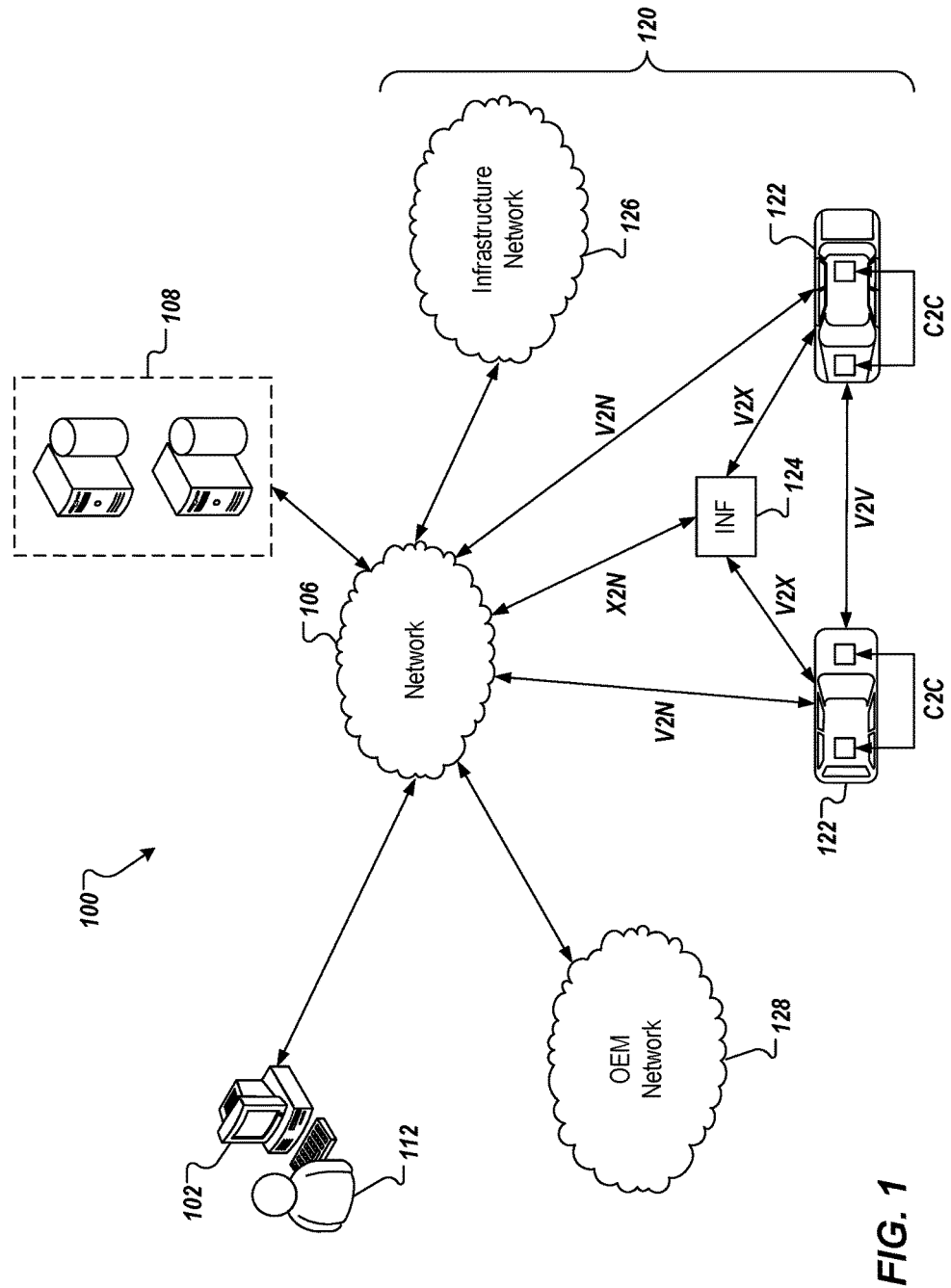
FIG. 1 depicts an example architecture that can be referenced to illustrate implementations of the present disclosure.

Implementations of the present disclosure are directed to a connected vehicle cyber-security platform. More particularly, implementations of the present disclosure are directed to a connected vehicle cyber-security platform that leverages digital twins across multiple layers of the connected vehicle ecosystem and generates analytical attack graphs (AAGs) based on digital twins to evaluate vulnerabilities and remedies within the connected vehicle ecosystem.

In some implementations, simulation and evaluation of a connected vehicle ecosystem using one or more AAGs is provided, each AAG representative of potential lateral movement within the connected vehicle ecosystem. In some implementations, actions include determining a set of components within the connected vehicle ecosystem, components within the set of components representing at least one layer within the connected vehicle ecosystem, for each component in the set of components: providing a set of facts representative of the respective component, and providing a component digital twin using the set of facts, defining a set of digital twins including digital twins of components in the set of components, generating, using the set of digital twins, at least one AAG representative of potential lateral movement between components of the at least one layer within the connected vehicle ecosystem, the at least one AAG representing a contextual digital twin of components operating within the connected vehicle ecosystem, and evaluating the connected vehicle ecosystem using the at least one AAG.

To provide context for implementations of the present disclosure, and as introduced above, over the last decade or so, the automotive industry has undergone a digital transformation to move to so-called connected vehicles. In general, a connected vehicle can be described as a vehicle having independent, function-specific systems that can communicate with one another and/or external systems. Accordingly, vehicles have transformed from mechanics and electronics to software and data to become distinct mobile data centers that are connected to other data centers (e.g., other vehicles, master cores, networks). Original equipment manufacturer (OEMs) and suppliers are struggling to cope with the sheer amount of software code resulting from this transformation both for the safety critical aspects and cyber security risks. For example, modern vehicles now have between seventy to a hundred different independent electronic control units (ECUs), which embody millions of lines of executed code (e.g., upwards of 150 million lines of code). Connected vehicles include a multitude of in-vehicle systems (e.g., fuel management system, battery management system, engine control system, motor control system, onboard diagnostics system, in-vehicle entertainment system, steering system, braking system, and the like). Each of these embedded systems controls a different subsystem of the vehicle. Some may be simple such as brake systems microcontrollers. Others may be entire computers, such as infotainment or Advanced Driving Assistance Systems (ADAS), such as Adaptive Cruise Control (ACC) and next generation autonomous driving systems. In most cases, each ECU comes with its own distinct architecture and software. At least some components of these systems communicate with one another and/or with other vehicles. Communication between in-vehicle components can be referred to as component-to-component (C2C) communication. Communication between vehicles can be referred to as vehicle-to-vehicle (V2V) communication.

In parallel with the digital transformation in the automotive industry, there has been a similar digital transformation in infrastructure, such a transportation infrastructure. This digital transformation of transportation infrastructure spans a multitude of regional levels (e.g., city, county, state, interstate, national). For example, transportation infrastructures are moving towards smart infrastructures having multitudes of components and systems that communicate with each other (e.g., street lamps, stop lights, traffic cameras) to manage transportation. Such transportation infrastructures can also communicate with connected vehicles, which can be referred to as vehicle-to-infrastructure (V2X) communication.

This digital transformation further extends to other networks. For example, connected vehicles can communicate with the Internet and/or other networks, such as OEM networks. Accordingly, another channel of communication can be referred to as vehicle-to-network (V2N) communication. As another example, infrastructure components can communicate with the Internet and/or other networks, such as infrastructure networks (e.g., a network operated by or on behalf of a city, state, or regional infrastructure authority).

Accordingly, another channel of communication can be referred to as infrastructure-to-network (X2N) communication.

With such a multitude of internals systems and connectivity across multiple channels (e.g., C2C, V2V, V2X, V2N, X2N), a plethora of attack surfaces become available for malicious users (e.g., hackers) to exploit the connected vehicle ecosystem. For OEMs and enterprise fleet management teams, a need to monitor and continuously manage the secure posture of the vehicles is expected. Such monitoring and managing of security can also be mandatory in view of governmental regulations (e.g., to mitigate risk to human lives both within the vehicle and the vehicle's surroundings, as well as to risk to private data of vehicle owners and/or passengers).

While there exist ways of identifying and mitigating risks and vulnerabilities of individual components within connected vehicles, the methodology of achieving it is mainly dependent on manual testing and audits of each in-vehicle component individually. For each component, these manual tests and audits can be described as 'black box' due to the lack of visibility of the component provided by suppliers, which is integrated into the vehicle by the OEM. This process makes the cost of vulnerability identification and remediation extremely expensive in terms of time, money, and technical resources (e.g., processing power, memory). This makes it infeasible to catch up with vulnerabilities arising as a result of frequent changes applied to the vehicle (e.g., software updates to individual systems). More plainly stated, there is no clear framework for, in terms of cyber-security, assessing risks to and attacks on connected vehicles in a standardized industry accepted manner within the connected vehicle ecosystem.

In view of the foregoing, implementations of the present disclosure are directed to a connected vehicle cyber-security platform. More particularly, implementations of the present disclosure are directed to a connected vehicle cyber-security platform that leverages digital twins across multiple layers of the connected vehicle ecosystem and generates AAGs based on digital twins to evaluate vulnerabilities and remedies within the connected vehicle ecosystem. For example, and as described in further detail herein, to defend against cyber-attacks, AAGs can be generated, which represent potential lateral movements of adversaries within and across layers of the connected vehicle ecosystem. Implementations of the present disclosure enable evaluation and mitigation of the security posture of connected vehicles throughout vehicle lifecycles, while supporting the agility and continuous deployment methodology as an integral part of the lifecycle.

In the context of the present disclosure, AAGs can represent attack paths within individual layers and/or across multiple layers of the connected vehicle ecosystem. Example layers can include, without limitation, a C2C layer (e.g., in-vehicle), a V2V layer (e.g., between vehicles), an infrastructure layer (e.g., in-infrastructure), a V2X layer (e.g., between infrastructure and vehicles), a V2N layer (e.g., between vehicles and networks), and an X2N layer (e.g., between infrastructure and networks). In some examples, an AAG can represent attack paths within a respective layer (e.g., attack paths between components within a vehicle (C2C)).

In some examples, an AAG can include multiple nested AAGs. For example, a nested AAG can represent a vehicle within the connected vehicle ecosystem. That is, for example, the vehicle is represented as an AAG within the larger AAG representing the connected vehicle ecosystem. In this sense, a nested AAG can be considered a sub-AAG of the AAG. In some examples, an AAG can represent attack paths across multiple layers (e.g., attack paths between components within a vehicle, attack paths between one or more components of the vehicle and one or more infrastructure components of an infrastructure, and attack paths between one or more infrastructure components of the infrastructure).

FIG. 1 depicts an example architecture 100 that can be referenced to illustrate implementations of the present disclosure. In the depicted example, the example architecture 100 includes a client device 102, a network 106, and a server system 108. The server system 108 includes one or more server devices and databases (e.g., processors, memory). In the depicted example, a user 112 interacts with the client device 102.

In some examples, the client device 102 can communicate with the server system 108 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provides such services to any number of client devices (e.g., the client device 102 over the network 106). In accordance with implementations of the present disclosure, and as noted above, the server system 108 can host at least a portion of a connected vehicle cyber-security platform.

In the example of FIG. 1, a connected vehicle ecosystem 120, also referred to as a landscape, is depicted. The connected vehicle ecosystem 120 is a non-limiting representation of connectivity between vehicles, components of vehicles, networks, and infrastructure components in the context of connected vehicles. In the example of FIG. 1, the connected vehicle ecosystem 120 includes vehicles 122, an infrastructure component 124 (e.g., street lamp, traffic light, traffic camera), an infrastructure network 126, and an OEM network 128. To the extent that communications can occur over the network 106, the network 106 can also be considered to be a part of the connected vehicle ecosystem 120. In some examples, the infrastructure network 126 represents on-premise systems (e.g., local and/or distributed), cloud-based systems, and/or combinations thereof, which operate on behalf of an infrastructure operator (e.g., a government authority). In some examples, the OEM network 128 represents on-premise systems (e.g., local and/or distributed), cloud-based systems, and/or combinations thereof, which operate on behalf of an OEM (e.g., an OEM that produced one or more of the vehicles).

In the example of FIG. 1, examples of various channels of communication (e.g., C2C, V2V, V2X, V2N, X2N) are noted. For example, within each vehicle 122, components can communicate with one another (C2C). As another example, one or more components of each vehicle 122 can communicate with the network 106 (V2N) and/or can communicate with the infrastructure component (V2X). As another example, the infrastructure component 124 (at least one or more components therein) can communicate with the network 106 (X2N).

In some examples, communication between the OEM network 128 and one or more components of each vehicle 122 (or one or more components therein) could occur (e.g., by design or by attack) over the network 106. In some examples, communication between the OEM network 128 and the infrastructure component 124 (or one or more sub-components therein) could occur (e.g., by design or by attack) over the network 106. In some examples, communication between the infrastructure network 126 and one or more components of each vehicle 122 (or one or more components therein) could occur (e.g., by design or by attack) over the network 106. In some examples, communication between the infrastructure network 126 and the infrastructure component 124 (or one or more sub-components therein) could occur (e.g., by design or by attack) over the network 106. In some examples, communication between the infrastructure network 126 and the OEM network 128 could occur (e.g., by design or by attack) over the network 106. These examples provide a non-limiting illustration of the plethora of attack paths that can exist within the connected vehicle landscape.

In some implementations, at least part of the connected vehicle cyber-security platform of the present disclosure is hosted within the server system 108. In some examples, and as described in further detail herein, the connected vehicle cyber-security platform can ingest and process information representative of layers of the connected vehicle ecosystem 120 to evaluate vulnerabilities and remedies across the connected vehicle ecosystem 120. In some examples, the user 112 can be a cyber-security expert, who interacts with the connected vehicle cyber-security platform through the client device 102. In some examples, and as described in further detail herein, one or more AAGs representative of individual layers and/or multiple layers of the connected vehicle ecosystem 120 are generated and can be used to identify attack paths representing vulnerabilities. Further, remedial measures that can be or have been implemented to mitigate vulnerabilities can be evaluated.

With particular reference to connected vehicles, the automotive industry is unique in its software supply chain characteristics, as Tier1/Tier2 suppliers tend to deliver blackbox firmware to OEMs and not the source code itself. This makes detection of vulnerabilities, validation of relevance of publicly published vulnerabilities, and assessment of risk overly complicated, if not impossible in some instances. In view of this, and prior to the connected vehicle cyber-security platform, a common practice within organizations has been relatively limited, manual evaluations. More particularly, although some supporting tools and scripts are used, most of the heavy lifting is performed manually for activities such as Threat Analysis and Risk Assessment (TARA) and prototype simulation. Such activities, however, are typically performed in the concept phase and do not provide a suitable solution for real-world components. Other approaches, such as Software in the Loop (SIL), have been introduced in order to detect and remove software faults. Such approaches, however, require several prerequisites (e.g., a dedicated hardware setup (test bench), signal analysis of communication lines, runtime evaluation). Such prerequisites make these approaches impractical in dealing with large numbers of components and variety of architectures and frameworks.

Further, new vulnerabilities, attack techniques, and threat intelligence constantly emerge and evolve. For example, software is also regularly updated by component vendors. Functionality, safety and regulatory requirements are primary drivers for these updates. For example, in 2018, Tesla added a new dash cam feature as part of their Autopilot 9.0 software update. Mapping these new potential threats to physical assets, to check their relevancy and potential impact is a challenge. It is a particular challenge in the technical context, for example, and as noted above, blackbox firmware (binary) prolific within connected vehicle ecosystems.

In view of this, the connected vehicle cyber-security platform provides a cybersecurity digital twin representation (referred to herein as digital twin) of individual components within the connected vehicle landscape. For example, a digital twin can be provided for each component in a vehicle, clusters of components within a vehicle, and the vehicle as a whole. As another example, a digital twin can be provided for each component in an infrastructure, clusters of components within an infrastructure, and the infrastructure as a whole. In the context of the present disclosure, the components include software systems and the digital twins are representations of software systems.

In general, a digital twin can be described as a virtual model of processes, products, people, places, systems, devices, services or states of any real-world entity. A digital twin can be connected to the real object using a digital thread. The digital twin can contain historical, present and future information and associations of the modeled entities to support inferences and insightful analytics. This pairing of the virtual and physical worlds through the digital thread enables analysis of monitored data from systems to, for example, anticipate and manage problems before they even occur; prognose systems to prevent downtime; optimize and develop opportunities; and plan future activities by using simulations and artificial intelligence (AI)-based predictive analytics. Conducting simulated investigations on the virtual copy instead of on the real-world entity can significantly decrease innovation costs without impacting production system availability and performance.

In the context of the present disclosure, real-world software systems (components) are modeled in respective digital twins. Leveraging these digital twins, and as described in further detail herein, the connected vehicle cyber-security platform addresses challenges of risk assessment and mitigation in connected vehicle ecosystems and cyber-security threats that emerge as these become more complex and software-defined products. Implementations of the present disclosure provide a holistic approach in which a set of independent vulnerabilities can be associated into a contextual relationship that simulates attacker adversarial movements in connected vehicle ecosystems. The digital twin simulation approach of the present disclosure addresses all participants in connected vehicle ecosystems, such as, but not limited to, the supply chain (e.g., OEM, tier suppliers, fleet managers) and connected environments (e.g., smart cities (infrastructures)), and the proliferation and deployment of IoT connected products and services. In other words, implementations of the present disclosure provide a digital twin for component software within connected vehicle ecosystems for the purpose of continuously monitoring for exposure to cyber-security risks and evaluating remedial measures.

Figure 2:
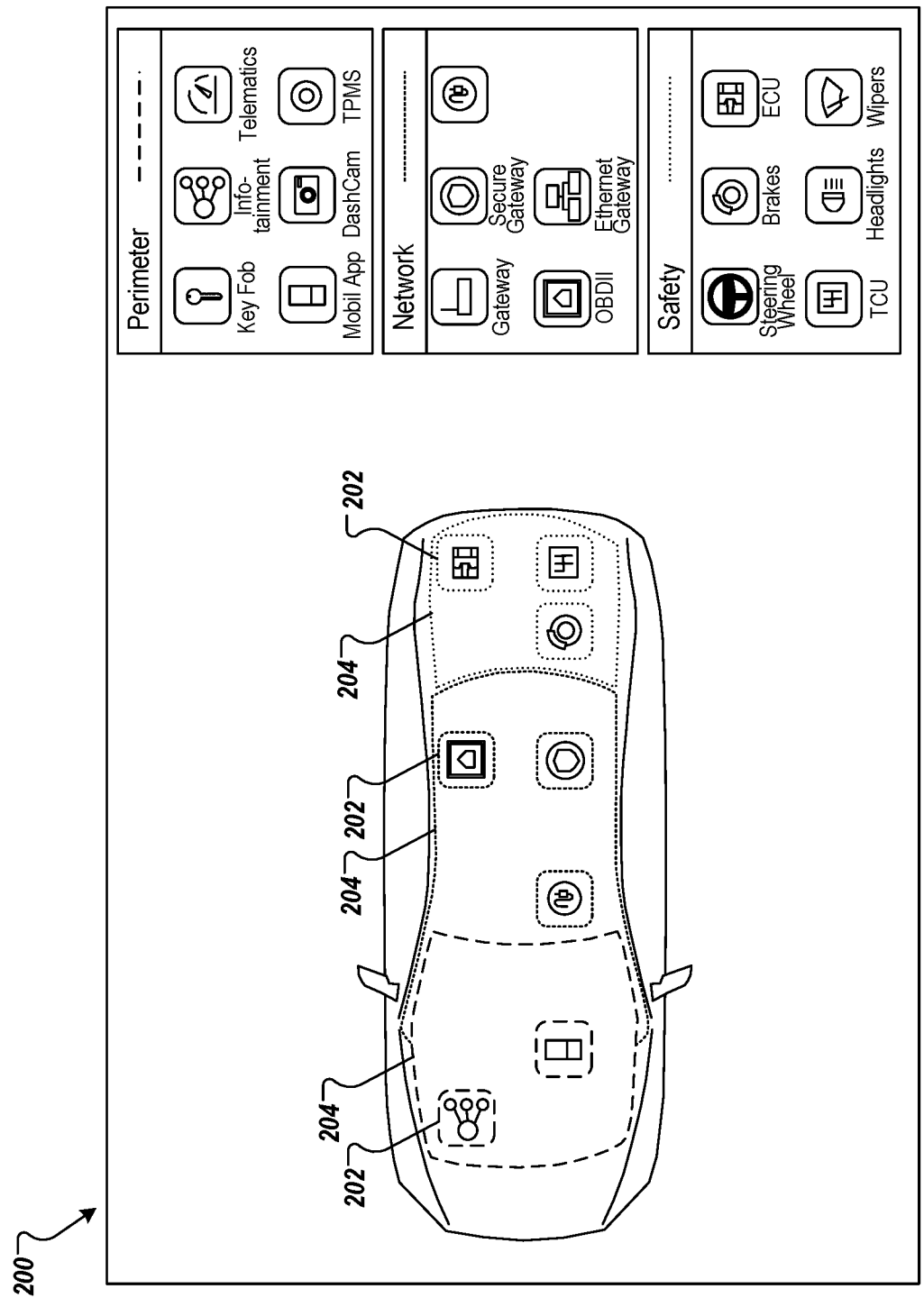
FIG. 2 depicts an example graphical representation of a digital twin of a vehicle in accordance with implementations of the present disclosure.

FIG. 2 depicts an example graphical representation 200 of a digital twin of a vehicle in accordance with implementations of the present disclosure. The example graphical representation 200 depicts components 202 (e.g., software systems) in a vehicle context divided into logical clusters 204. As depicted in FIG. 2, components 202 can communicate with one another, and some components 202 can communicate with components or networks that are external to the vehicle (e.g., a component 202 can be an Internet-connected component that can communicate over the Internet; a component 202 can communicate with a component of another vehicle for V2V communication). Consequently, and in the context of connected vehicles, cyber-security is not limited to a vehicle itself, but also what the vehicle can connect to within the connected vehicle environment.

To bring the digital twin concept into practice in the connected vehicle context, implementations of the present disclosure provide a model of automotive components that represents its entire structure and context. For example, the digital twin is a digital representation of multiple components and can be representative of, for example and without limitation, an in-vehicle system, multiple in-vehicle systems, a vehicle, or connected vehicle ecosystem. A digital twin can be described as a "living" digital representation of an entity, containing facts and further modeling about the components to enable simulations of the entity (e.g., in-vehicle system, multiple in-vehicle systems, vehicle, connected vehicle ecosystem). In some examples, a digital twin takes information gathered by a digital thread (discussed in further detail herein) and puts the data into context using an ontology to model the real-world implementation of the entity represented by the digital twin. In the cyber context, this can be based on facts-rules-impacts or any extension/different modeling of the world. Facts are stored in a "data lake" (since facts can be collected from multiple digital threads), and later passed into modeling and context over a graph.

In some implementations, the digital twin is provided using a digital thread, which can be described as a layer of data collection (e.g., a data ingestion layer) from the real-world components (e.g., ECUs) into a digital representation. In some implementations, and without limitation, the digital thread includes the following facts: {software bill of materials (SBOM); operating system and kernel configuration; application configuration; network and local interfaces; control and data flow representation; encryption mechanisms, keys, and flows; memory management and mapping; application programming interfaces (APIs) status (e.g., available, accessible, in-use); application frameworks in use and their configuration; peripheral components and their integration}. The digital thread enables generation of a digital twin, such that analytics can be performed on top of the digital twin. In some examples, these parameters that fully represent and characterize the software structure of the component should be represented in a way that enables querying and correlation of new findings in a reasonable time and space complexity. Moreover, it should be represented in a way that enables the emulation of the original firmware, providing an effective representation of the real-life component.

As introduced above, in the context of connected vehicles, software systems are provided as binary firmware. Further, the binary firmware is itself is not normalized, and therefore does not offer an opportunity to provide actionable findings. Generic binary firmware can represent a multitude of possible hardware platforms, operating systems, software libraries, data flow context and configurations. Consequently, the binary firmware itself cannot provide any meaningful data without further processing.

To derive data from binary firmware to provide digital twins, implementations of the present disclosure use a so-called Deep Binary Analysis (DBA) process. An example platform for binary code analysis is provided by Cybellum Ltd. of Tel Aviv, Israel. In general, binary firmware is processed to normalize data therein, such as the entire SBOM, data flow and configuration of the metadata, into a structured, well understood digital structured representation (e.g., vector/environment/setup/configuration/instance) that can then be further analyzed and used for various purposes. The structured representation represents a single component and functions as a database object to store data regarding the component. In accordance with implementations of the present disclosure, a digital twin of an entity (e.g., in-vehicle system, multiple in-vehicle systems, vehicle, connected vehicle ecosystem) can be constructed using structured representations of respective components and can be used to execute simulations in real-world scenarios.

In further detail, the DBA process can analyze binary firmware, map the entire software stack represented in the binary firmware, extract configurations and data flows, and extract facts for populating the digital thread. The input for the DBA process is the firmware of components of the vehicle. Example firmware can include, but is not limited to, ECU firmware, motor control unit (MCU) firmware, mobile application firmware, key fob firmware, gateway firmware, and the like. In some examples, the firmware is fully mapped into a coherent SBOM. This mapping includes, but is not limited to, the operating system, boot image, interfaces, drivers, the file system structure, configurations, and the full software stack mapping. In some examples, a virtual running image of the original software is created. Machine-level code paths are dynamically parsed from the image, as well as data flows, hardware interfaces, system configuration, boot time authentication, encryption settings, among other characteristics and parameters of the component. The extracted facts can be used to define a digital twin.

As introduced above, the connected vehicle cyber-security platform of the present disclosure leverages digital twins across multiple layers of the connected vehicle ecosystem and generates AAGs based on digital twins to evaluate vulnerabilities and remedies within the connected vehicle ecosystem. In general, an AAG can be used to understand how a network can be hacked and undesirable consequences that can result. Accordingly, AAGs can be described as an important tool in developing anti-hacker defenses. For example, an AAG can be used to identify the most vulnerable components within a network, and can be used to evaluate fixes of vulnerabilities that the AAG reveals (e.g., by fixing a limited number of issues, any adversary attack on the network, or on certain components in the network can be stopped). In the context of the present disclosure, a network can be considered as a layer of the connected vehicle ecosystem and/or multiple layers across the connected vehicle ecosystem. In view of this, and in accordance with implementations of the present disclosure, an AAG can represent attack paths within a respective layer of the connected vehicle ecosystem, and/or attack paths across multiple layers of the connected vehicle ecosystem.

As introduced above, collecting factual information on each of the components of a vehicle serves as the foundation for construction of a digital twin. In accordance with implementations of the present disclosure, the digital twin uses the AAG ontology, such as that provided in MulVal, for example. Namely, each connected subgraph of an AAG represents a progress an adversary may exploit as part of his campaign. In the context of a connected vehicle ecosystem, this approach can productized in scale together with ingestion of further facts of infrastructure components, infrastructure networks, OEM networks, and the like, which can be used in threat intelligence, impact analysis, vulnerabilities scoring, among others.

Figure 3:
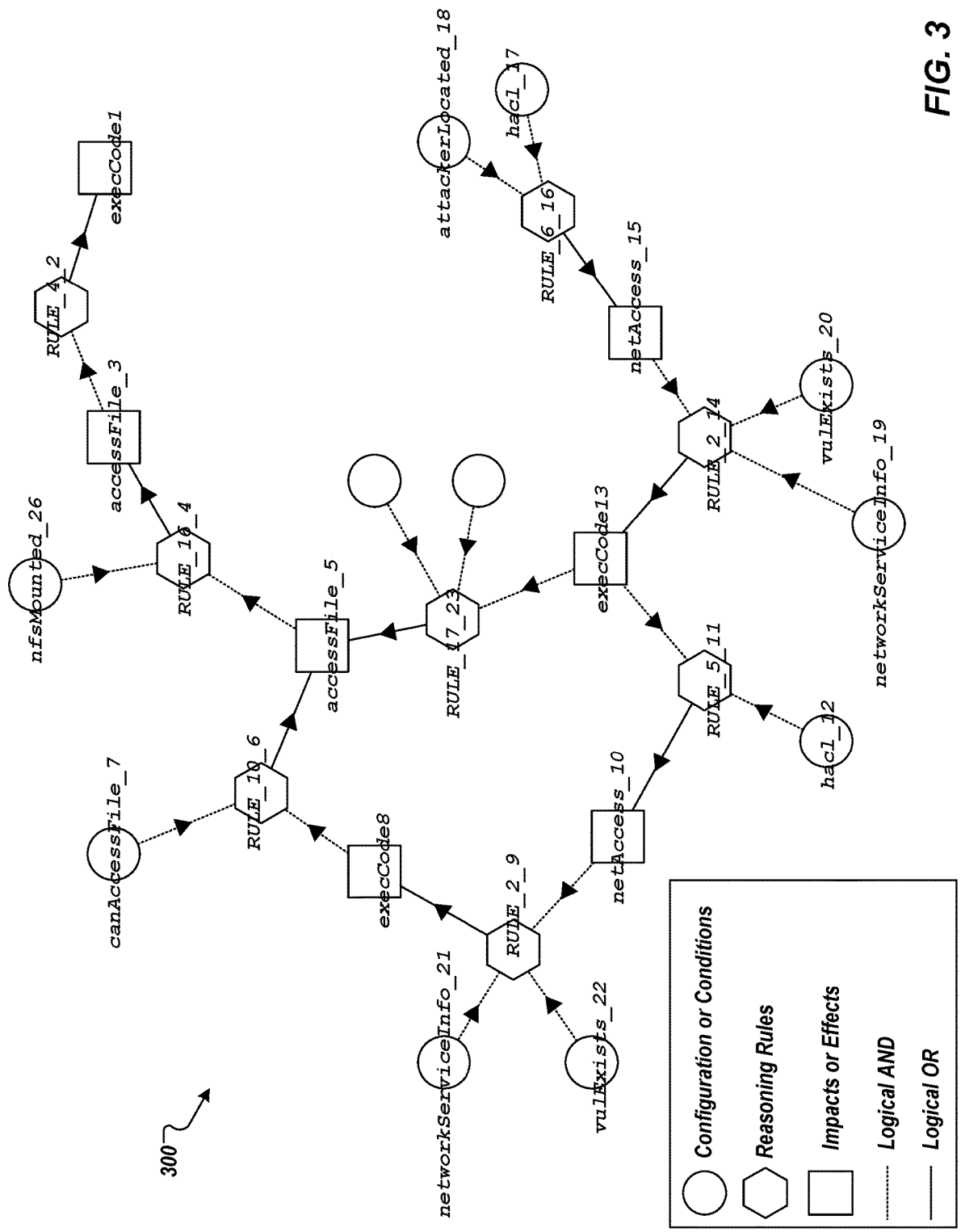
FIG. 3 depicts an example portion of an example analytical attack graph (AAG) to illustrate implementations of the present disclosure.

FIG. 3 depicts an example portion 300 of an example AAG to illustrate implementations of the present disclosure. As depicted in the example of FIG. 3, the AAG can include different node types to show how a set of component and system configurations result in unauthorized actions to specific targets. The example portion 300 is depicted in a database structure (e.g., Neo4j graph database structure). Nodes in an AAG are of different types: circular nodes representing system or network configurations that are the conditions that provide possibilities for actions by an attacker; circle-shaped nodes representing reasoning rules that represent the attack methodology leveraged by an attacker to achieve a particular goal; and square nodes that represent an impact as a sub-goal for a certain action an attacker could take. The AAG includes two types of edges: configuration-to-rule edges that represent logical AND (i.e., all configuration conditions have to be true to cause the impact; and rule-to-impact edges that represent logical OR (i.e., the impact happens if at least one rule is satisfied).

In general, the AAG is created by taking into account the configurations directed by some rules in order to make some impacts on the target network. In some examples, all configuration nodes, impact nodes, and rule nodes can be provided in sets $N_p$, $N_d$, $N_r$, respectively. Accordingly, $N_p = \{n_{p,j} | n_{p,j} \in V, \forall n_{p,j} \text{ is a configuration}\}$, $N_d = \{n_{d,j} | n_{d,j} \in V, \forall n_{d,j} \text{ is an impact}\}$, and $N_r = \{n_{r,j} | n_{r,j} \in V, \forall n_{r,j} \text{ is a rule}\}$. Consequently, the combination of these sets accounts for all vertices of the graph. In some examples, a configuration node is referred to herein as an input fact node indicating facts that are provided as input within a configuration. In some examples, impact nodes are referred to herein as derived fact nodes indicating a derived fact that results from applying one or more input facts and/or one or more derived facts to a rule.

AAGs can be used in cyber-threat analysis to determine attack paths of external attackers into and through a computer network. Use of AAGs in mitigating attacks on computer networks is described in further detail in commonly assigned U.S. application Ser. No. 16/554,846, entitled Generating Attack Graphs in Agile Security Platforms, and filed on Aug. 29, 2019, the disclosure of which is expressly incorporated herein by reference in the entirety for all purposes. Further, generation of AAGs is described in further detail in commonly assigned U.S. application Ser. No. 16/924,483, entitled Resource-efficient Generation of Analytical Attack Graphs, and filed on Jul. 9, 2020, the disclosure of which is expressly incorporated herein by reference in the entirety for all purposes.

To provide further context for implementations of the present disclosure, the AAG model presented in MulVAL will be briefly discussed. MulVAL can be described as an automatic end-to-end AAG generation framework. In general, MulVAL takes a specification, such as, but not limited to, MITRE Common Vulnerabilities and Exposures (CVE), describing the configuration of an enterprise network and rules that depict how an attacker can exploit the system configurations to advance in the enterprise network towards a target goal. MulVAL uses datalog as a specification language. In datalog, logical and physical entities of the enterprise network are formally modeled by datalog predicates; n-ary relations between entities are defined by datalog relations; and attack rules are modeled as datalog derivation rules in a datalog program. Derivation rules define preconditions (set of predicates connected by logical 'and') that, if met, derive new predicates. The specification of the predicates and derivation rules can be referred to as the datalog program of the system (enterprise network).

MulVAL uses a datalog solver on the program specification to check whether there exists an attack path from the input facts to a target goal. It does this by iteratively applying the derivation rules on facts until either reaching a target goal (a path exists) or reaching a fixed point, from which no new fact can be derived. In this case, no attack path to the target exists and the system is considered to be secure.

The derivation process from the grounded facts to the target goals is represented in the resulting AAG. An AAG is provided as a data object that records nodes and edges between nodes, described herein. The data object underlying an AAG can be processed to generate a visual representation, a graph, of the AAG.

In further detail, MulVAL generates an AAG that shows the derivation of grounded facts by the application of rules. Formally, the AAG is defined as: AAG=($N_r$, $N_p$, $N_d$, E, L, Args, G), where $N_r$, $N_p$, $N_d$ are the sets of nodes (rules (r), input facts (p), and derived facts (d), respectively), E is a set of edges that connect from facts to derivation rules (precondition) and from derivation rules to derived facts, L is a mapping from a node (i.e., an input fact, a derived fact, a rule) to its label (i.e., the predicate or rule that it is associated with), Args is a mapping of facts to their arguments (i.e., objects they are associated with), and $G \in N_d$ describes the target goal (e.g., crown jewel that may be a target for hackers). N denotes the union of all node elements in the graph (i.e., $N = N_r \cup N_p \cup N_d$). In some examples, primitive nodes and derived nodes (i.e., fact nodes) are denoted by $N_f$, where $N_f = N_p \cup N_d$. Every fact node in the graph is labeled with a logical statement in the form of a predicate applied to its arguments.

Because the nature of vulnerabilities in connected vehicle ecosystems is different from an information technology (IT) setting or an industrial control systems (ICS) setting, implementations of the present disclosure provide sets of rules to model the attack tactics for construction of AAGs. In some examples, the sets of rules can define conditions, in which components can communicate with one another, even though not intended to communicate with one another. Whether the conditions are met is determined based on one or more facts. As introduced above, example facts can include, without limitation, a type of processor, a version of software, a SBOM, operating system and kernel configuration, application configuration, network and local interfaces, control and data flow representation, encryption mechanisms, keys, and flows, memory management and mapping, APIs status, application frameworks in use and their configuration, and peripheral components and their integration. For example, and without limitation, an example set of rules can define conditions in which an infotainment system can cross a gateway and communicate with an ECU of the brake system. The conditions can represent a combination of facts that, if present, indicate that the infotainment system can cross the gateway and communicate with the ECU of the brake system. For example, of the infotainment system includes a particular type of processor (fact) that executes a particular version of software (fact) and the ECU of the brake system executes a particular version of software (fact), then the conditions are met and the infotainment system can cross the gateway and communicate with the ECU of the brake system.

In some implementations, an AAG of the present disclosure contains not only the security properties of the components of the vehicle, but also any contextual relationships that exist within the components as well as between components. The constructed AAG represents multiple attack paths towards critical assets (e.g., an engine, steering) of the vehicle and serve as a knowledge graph for the security posture of the scope of vehicles. In some implementations, the AAG includes multiple nested AAGs. A nested AAG can represent a vehicle within the connected vehicle ecosystem.

From a broader perspective, as part of scaling into a fleet of vehicles that are connected through the fleet's backend core, a vulnerability can expose how an adversary may take advantage of a single compromised vehicle (e.g., an earlier model of the vehicle) and can achieve an attack (e.g., a remote denial of service (DoS)) on the entire fleet. Based on a given AAG, analytics can be executed to gain insights and enable prioritization of remedial actions in order to reduce risk.

In some examples, vulnerabilities that may not have any impact on the vehicle functionality/security and/or that of the broader connected vehicle ecosystem can be identified and addressing such vulnerabilities can be assigned a lower priority, if any. Moreover, data from other domains can be applied and ingested into digital twins, which enable analytics to be extended to address other areas, such as, without limitation, threat actors, geographical location-associated tactics and the like. This results in even more precise insights on the security posture of individual vehicles (e.g., the vehicle layer) and/or across multiple layers of the connected vehicle ecosystem.

In some implementations, an AAG can be considered a digital twin of an entity (component) of the connected vehicle ecosystem. In the cyber-security context, an AAG can be described as a contextual digital twin. More particularly, after the digital thread, structured representations of a respective components. These are individual components containing facts and, in some instances, analytics over these facts (e.g., a CVE that can be associated given a known version of an application).

The contextual digital twin, that is, the contextual AAG of the present disclosure, is generated by solving a set of problems (as described herein) and represents both a context internally within components and externally within the connected vehicle ecosystem that the components operate within. The AAG is a rich set of connections (context) between facts given an expertise in the cyber domain in general and in specific industries in particular (e.g., automotive).

Figure 4:
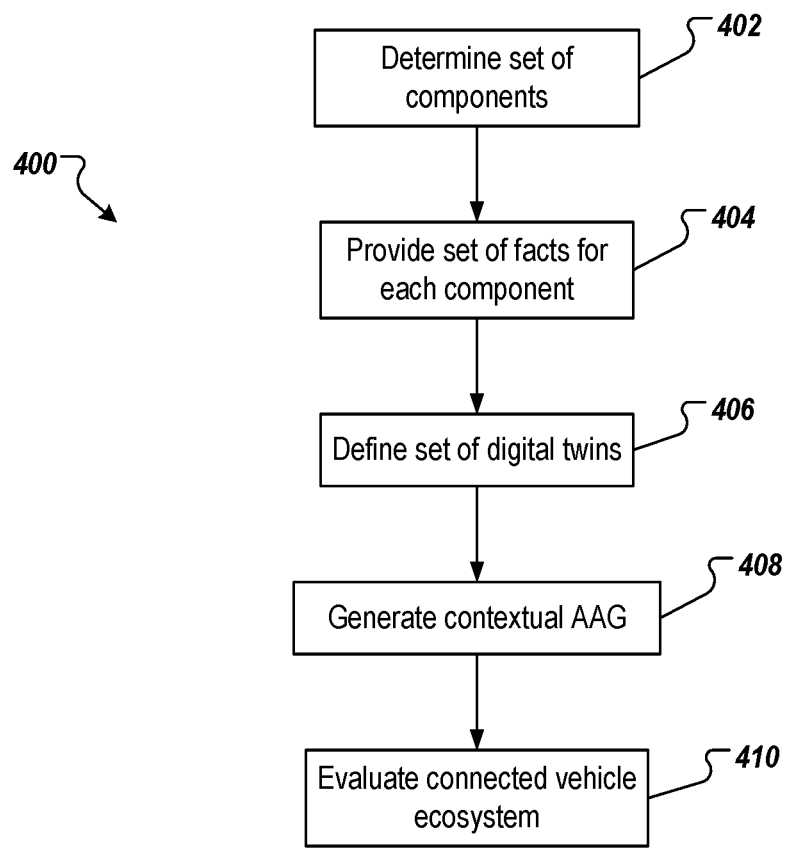
FIG. 4 depicts an example process that can be executed in accordance with implementations of the present disclosure.

FIG. 4 depicts an example process 400 that can be executed in accordance with implementations of the present disclosure. In some implementations, the example process 400 may be performed using one or more computer-executable programs executed using one or more computing devices.

Determine set of components (402). For example, and as described in further detail herein, a set of components corresponding to a layer or multiple layers in a connected vehicle ecosystem can be determined. Example layers can include, without limitation, a C2C layer (e.g., in-vehicle), a V2V layer (e.g., between vehicles), an infrastructure layer (e.g., in-infrastructure), a V2X layer (e.g., between infrastructure and vehicles), a V2N layer (e.g., between vehicles and networks), and an X2N layer (e.g., between infrastructure and networks). In one non-limiting example, a set of components can include components at the C2C layer (e.g., ECU firmware, MCU firmware, key fob firmware, gateway firmware). In another non-limiting example, a set of components can include components at the C2C layer (e.g., ECU firmware, MCU firmware, key fob firmware, gateway firmware) and components at the V2X layer (e.g., firmware within infrastructure components, infrastructure network).

Provide set of facts for each component (404). For example, and as described in detail herein, sets of facts for respective components are provided through a digital thread. In some examples, each component can be processed through binary code analysis to provide facts representative of the component. In some implementations, the firmware is fully mapped into a coherent SBOM, the mapping including, but is not limited to, the operating system, boot image, interfaces, drivers, the file system structure, configurations, and the full software stack mapping. In some examples, a virtual running image of the original software is created. Machine-level code paths are dynamically parsed from the image, as well as data flows, hardware interfaces, system configuration, boot time authentication, encryption settings, among other characteristics and parameters of the component. Accordingly, for each component, a set of facts is extracted through the binary code analysis. A set of digital twins is defined (406). For example, and as described herein, a set of digital twins can be provided for components in each layer represented in the set of components.

One or more (contextual) AAGs are generated based on sets of digital twins (408). For example, and as described herein, for each component, one or more facts in the set of facts are used as facts for generation of an AAG that represents the layer or multiple layers. In some examples, a set of rules is provided, the set of rules defining conditions, in which components can communicate with one another, even though not intended to communicate with one another. For example, and without limitation, an example set of rules can define conditions, in which an infotainment system can cross a gateway and communicate with an ECU of the brake system.

The connected vehicle ecosystem is evaluated using the AAG (410). In some examples, a risk value can be determined based on an AAG, the risk value representing a relative risk that a particular impact can occur in the connected vehicle ecosystem. An example risk value is discussed in detail in commonly assigned U.S. application Ser. No. 17/080,252, entitled Process Risk Calculation based on Hardness of Attack Paths, and filed on Oct. 26, 2020, the disclosure of which is expressly incorporated herein by reference in the entirety for all purposes. In response to determining that the risk value exceeds a threshold risk value, one or more remedial measures (also referred to as security controls) can be selectively adjusted within the connected vehicle ecosystem in an effort to mitigate risk. In some examples, adjusting one or more security controls can include implementing one or more security controls in an effort to mitigate process risk. In some examples, selectively adjusting one or more security controls can include halting and/or reversing at least one security control that had been previously implemented in an effort to mitigate process risk. Example security controls can include, without limitation, updating or patching a component within the connected vehicle system. For example, a software update can be pushed to all vehicles that execute a component determined to present a vulnerability that can be mitigated by the software update.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for simulation and evaluation of a connected vehicle ecosystem using one or more analytical attack graphs (AAGs), each AAG representative of potential lateral movement within the connected vehicle ecosystem, the method being executed by one or more processors and comprising:
    determining a set of components within the connected vehicle ecosystem, components within the set of components representing at least one layer within the connected vehicle ecosystem;
    for each component in the set of components:
        providing a set of facts representative of the respective component, and
        providing a component digital twin using the set of facts;
    defining a set of digital twins including digital twins of components in the set of components;
    generating, using the set of digital twins, at least one AAG representative of potential lateral movement between components of the at least one layer within the connected vehicle ecosystem, the at least one AAG representing a contextual digital twin of components operating within the connected vehicle ecosystem; and
    evaluating the connected vehicle ecosystem using the at least one AAG.

2. The method of claim 1, wherein the set of components comprises a first sub-set of components representative of components of a vehicle and a second sub-set of components representative of components of an infrastructure.

3. The method of claim 1, wherein each component comprises software executed within a layer of the connected vehicle ecosystem.

4. The method of claim 3, wherein the software is binary firmware.

5. The method of claim 1, wherein the set of facts comprises one or more of a software bill of materials (SBOM), operating system and kernel configuration, application configuration, network interfaces, local interfaces, control flow representation, data flow representation, encryption mechanisms, encryption keys, encryption flows, memory management, memory mapping, application programming interfaces (APIs) status, application frameworks, application framework configurations, peripheral components, and peripheral component integrations.

6. The method of claim 1, wherein the at least one AAG is generated using a set of rules, the set of rules defining conditions in which components in the set of components can communicate with one another based on one or more facts in the set of facts.

7. The method of claim 1, wherein evaluating the connected vehicle ecosystem using the at least one AAG comprises determining a risk value based on the at least one AAG, and selectively adjusting one or more remedial measures within the connected vehicle ecosystem in an effort to mitigate risk in response to the risk value.

8. The method of claim 1, wherein the at least one AAG comprises one or more nested AAGs therein.

9. The method of claim 1, wherein at least one nested AAG represents a vehicle within the connected vehicle ecosystem.

10. The method of claim 1, wherein providing a set of facts representative of the respective component comprises executing binary code analysis to define the set of facts.

11. The method of claim 1, wherein providing a set of facts representative of the respective component comprises receiving data representative of one or more of a source file, an internet protocol (IP) address, a port, a protocol, a header file, a functions name, a memory structure, and memory allocations.

12. The method of claim 1, wherein evaluating the connected vehicle ecosystem using the at least one AAG comprises one or more of:
    evaluating one or more of vulnerabilities and remedial measures within the connected vehicle ecosystem,
    evaluating risk to one or more processes executed within the connected vehicle ecosystem, or
    optimizing investment of entities comprising one or more components within the connected vehicle ecosystem.

13. One or more non-transitory computer-readable storage media coupled to one or more processors and having instructions stored thereon which, when executed by the one or more processors, cause the one or more processors to perform operations for vulnerability detection in a connected vehicle ecosystem using one or more analytical attack graphs (AAGs), each AAG representative of potential lateral movement within the connected vehicle ecosystem, the operations comprising:
    determining a set of components within the connected vehicle ecosystem, components within the set of components representing at least one layer within the connected vehicle ecosystem;
    for each component in the set of components:
        providing a set of facts representative of the respective component, and
        providing a component digital twin using the set of facts;
    defining a set of digital twins including digital twins of components in the set of components;
    generating, using the set of digital twins, at least one AAG representative of potential lateral movement between components of the at least one layer within the connected vehicle ecosystem, the at least one AAG representing a contextual digital twin of components operating within the connected vehicle ecosystem; and
    evaluating the connected vehicle ecosystem using the at least one AAG.

14. The computer-readable storage media of claim 13, wherein the set of components comprises a first sub-set of components representative of components of a vehicle and a second sub-set of components representative of components of an infrastructure.

15. The computer-readable storage media of claim 13, wherein each component comprises software executed within a layer of the connected vehicle ecosystem.

16. The computer-readable storage media of claim 15, wherein the software is binary firmware.

17. The computer-readable storage media of claim 13, wherein the set of facts comprises one or more of a software bill of materials (SBOM), operating system and kernel configuration, application configuration, network interfaces, local interfaces, control flow representation, data flow representation, encryption mechanisms, encryption keys, encryption flows, memory management, memory mapping, application programming interfaces (APIs) status, application frameworks, application framework configurations, peripheral components, and peripheral component integrations.

18. The computer-readable storage media of claim 13, wherein the at least one AAG is generated using a set of rules, the set of rules defining conditions, in which components in the set of components can communicate with one another based on one or more facts in the set of facts.

19. The computer-readable storage media of claim 13, wherein evaluating one or more of vulnerabilities and remedial measures within the connected vehicle ecosystem using the at least one AAG comprises determining a risk value based on the at least one AAG, and selectively adjusting one or more remedial measures within the connected vehicle ecosystem in an effort to mitigate risk in response to the risk value.

20. A system, comprising:
one or more processors; and
a computer-readable storage device coupled to the one or more processors and having instructions stored thereon which, when executed by the one or more processors, cause the one or more processors to perform operations for vulnerability detection in a connected vehicle ecosystem using one or more analytical attack graphs (AAGs), each AAG representative of potential lateral movement within the connected vehicle ecosystem, the operations comprising: determining a set of components within the connected vehicle ecosystem, components within the set of components representing at least one layer within the connected vehicle ecosystem;
for each component in the set of components:
providing a set of facts representative of the respective component, and
providing a component digital twin using the set of facts;
defining a set of digital twins including digital twins of components in the set of components;
generating, using the set of digital twins, at least one AAG representative of potential lateral movement between components of the at least one layer within the connected vehicle ecosystem, the at least one AAG representing a contextual digital twin of components operating within the connected vehicle ecosystem; and
evaluating the connected vehicle ecosystem using the at least one AAG.

* * * * *